US012736896B2

(12) United States Patent
Hayashida et al.

(10) Patent No.: US 12,736,896 B2
(45) Date of Patent: Sep. 15, 2026

(54) IMAGE FORMING APPARATUS HAVING CYCLONIC SEPARATING PORTION, TONER CONTAINER, AND DEVELOPING APPARATUS

(71) Applicant: CANON KABUSHIKI KAISHA, Tokyo (JP)

(72) Inventors: Kei Hayashida, Tokyo (JP); Noritomo Yamaguchi, Kanagawa (JP); Takeo Kawanami, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/796,766

(22) Filed: Aug. 7, 2024

(65) Prior Publication Data

US 2025/0068099 A1 Feb. 27, 2025

(30) Foreign Application Priority Data

Aug. 23, 2023 (JP) ................................ 2023-135875

(51) Int. Cl.
*G03G 15/08* (2006.01)
*G03G 21/20* (2006.01)

(52) U.S. Cl.
CPC ..... *G03G 15/0877* (2013.01); *G03G 15/0865* (2013.01); *G03G 15/0875* (2013.01);
(Continued)

(58) Field of Classification Search
CPC ........... G03G 15/0877; G03G 15/0875; G03G 2215/068; G03G 15/0891; G03G 21/206;
(Continued)

(56) References Cited

U.S. PATENT DOCUMENTS 5,649,271 A * 7/1997 Bray .................. G03G 15/0898
399/266
6,151,471 A * 11/2000 Yahata ............... G03G 15/0822
399/258
(Continued)

FOREIGN PATENT DOCUMENTS

JP S59171983 A 9/1984
JP S61151675 A * 7/1986
(Continued)

OTHER PUBLICATIONS

Extended European Search Report issued in European Appln. No. 24195565.7, mailed Jan. 27, 2025.
(Continued)

*Primary Examiner* — Stephanie E Bloss
*Assistant Examiner* — Laura Roth
(74) *Attorney, Agent, or Firm* — ROSSI, KIMMS & McDOWELL LLP

(57) ABSTRACT

An image forming apparatus includes a photosensitive drum, a toner storage portion, a developing roller including a toner bearing portion, and a cyclonic separating portion including an intake port, a first discharge port communicating with an interior of the toner storage portion, and a second discharge port communicating with an outside of the toner storage portion. The cyclonic separating portion includes a conical portion formed in a conical frustum shape whose radius decreases as the conical frustum shape extends downward. The first discharge port is disposed at a lower end portion of the conical portion. At least a portion of the conical portion projects downward with respect to an inner upper surface of the toner storage portion.

16 Claims, 16 Drawing Sheets

(52) U.S. Cl.
CPC ..... *G03G 15/0879* (2013.01); *G03G 15/0889* (2013.01); *G03G 21/206* (2013.01); *G03G 2215/068* (2013.01); *G03G 2215/0872* (2013.01)

(58) Field of Classification Search
CPC ............. G03G 15/087; G03G 15/0887; G03G 15/0889; G03G 15/0865; G03G 15/0879; G03G 2215/066; G03G 2215/0682; G03G 2215/0872; G03G 2215/0869; G03G 2221/1645
See application file for complete search history.

(56) References Cited

U.S. PATENT DOCUMENTS

2004/0105704 A1* 6/2004 Yamauchi .......... G03G 15/0865 399/258
2008/0145104 A1 6/2008 Werf et al.

FOREIGN PATENT DOCUMENTS

| | | | | |
|---|---|---|---|---|
| JP | H10301381 | A | | 11/1998 |
| JP | 2000081778 | A | | 3/2000 |
| JP | 2001022154 | A | | 1/2001 |
| JP | 2005250508 | A | | 9/2005 |
| JP | 2007328048 | A | * | 12/2007 |

OTHER PUBLICATIONS

Office Action issued in Indian Appln. No. 202444062490, mailed Jun. 11, 2026.

* cited by examiner

FIG.8A
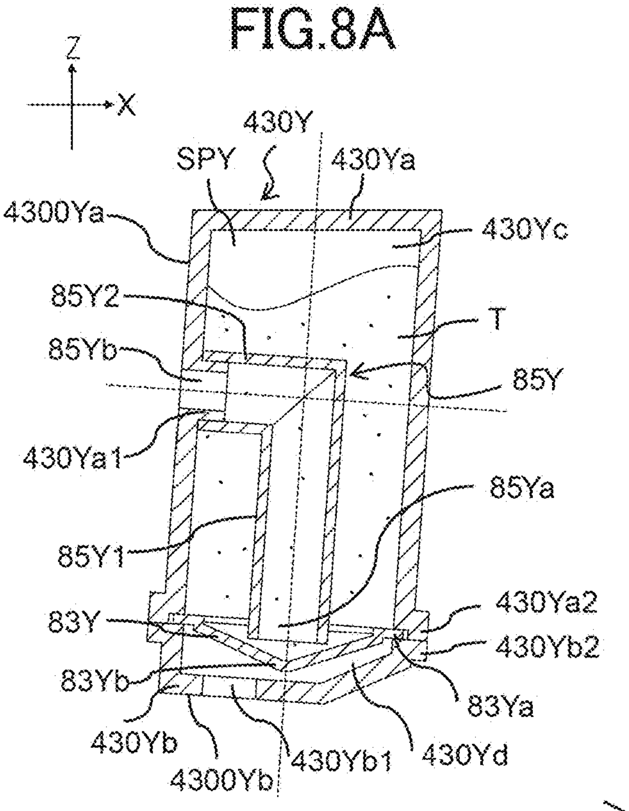
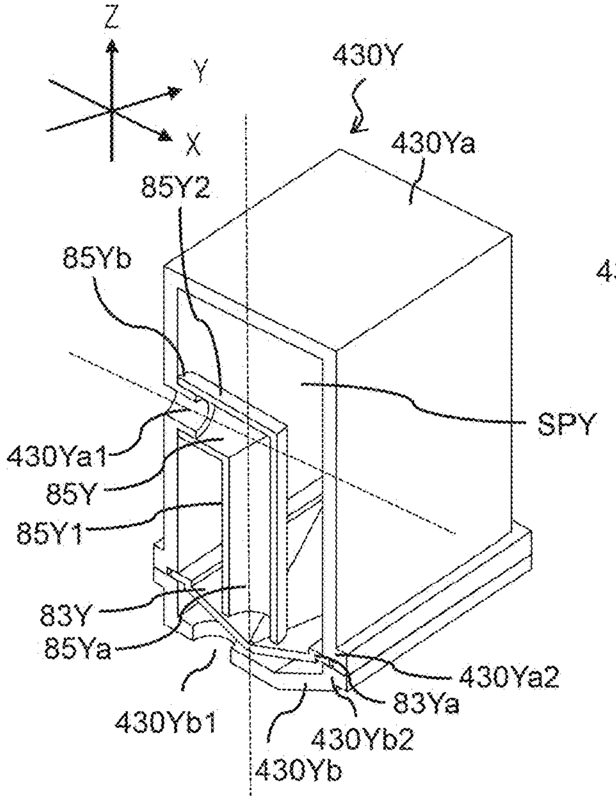
FIG.8B
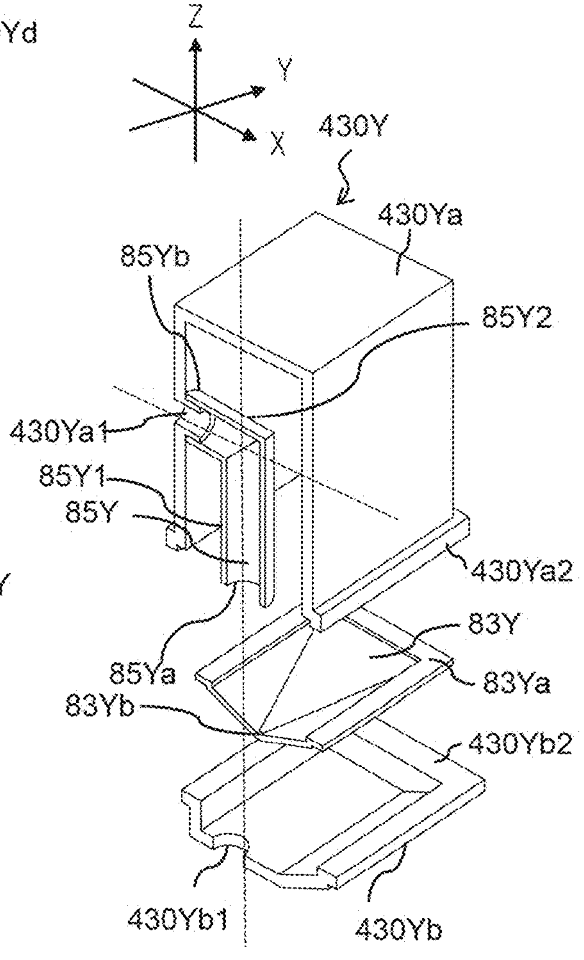
FIG.8C

IMAGE FORMING APPARATUS HAVING CYCLONIC SEPARATING PORTION, TONER CONTAINER, AND DEVELOPING APPARATUS

BACKGROUND OF THE INVENTION

Field of the Invention

The present invention relates to an image forming apparatus that forms images on recording materials, a toner container that accommodates toner, and a developing apparatus that is used in the image forming apparatus.

Description of the Related Art

In the electrophotographic image forming apparatus, since the toner stored in the toner storage portion (i.e., the developer container) of the developing apparatus is consumed when images are formed, toner is supplied from a toner container that contains the toner for the supply, to the toner storage portion. Japanese Patent Application Publication No. 2000-081778 describes a configuration in which toner is conveyed from a toner container to a developing apparatus by the airflow generated by an air pump.

In the configuration described in Japanese Patent Application Publication No. 2000-081778, a filter that discharges air is disposed on a path along which air that contains toner flows toward the developing apparatus.

SUMMARY OF THE INVENTION

According to an aspect of the invention, an image forming apparatus includes a photosensitive drum, a toner storage portion configured to store toner and to be supplied with the toner by using air, a developing roller configured to rotate about a rotation axis, the developing roller including a toner bearing portion configured to bear the toner stored in the toner storage portion and supply the toner to the photosensitive drum, and a cyclonic separating portion including an intake port, a first discharge port communicating with an interior of the toner storage portion, and a second discharge port communicating with an outside of the toner storage portion, the cyclonic separating portion being configured to take in the air mixed with the toner through the intake port, separate the toner and the air from each other, discharge the toner separated from the air through the first discharge port, and discharge the air separated from the toner through the second discharge port, wherein the cyclonic separating portion is provided on an upper surface portion of the toner storage portion, wherein the cyclonic separating portion includes a conical portion formed in a conical frustum shape whose radius decreases as the conical frustum shape extends downward, wherein the first discharge port is disposed at a lower end portion of the conical portion, and wherein at least a portion of the conical portion projects downward with respect to an inner upper surface of the toner storage portion.

According to another aspect of the invention, a toner container includes (i) a container constituting a toner accommodating space configured to accommodate toner, and (ii) a cyclonic separating portion (ii-i) including a conical portion and (ii-ii) configured (ii-ii-i) to take in air with the toner, (ii-ii-ii) to separate the air and the toner, (ii-ii-iii) to discharge the toner separated from the air into the toner accommodating space, and (ii-ii-iv) to discharge the air separated from the toner outside the container, wherein when the toner container is oriented in a direction in which a center axis of the conical portion extends in a gravity direction and an inner diameter of the conical portion decreases toward the gravity direction, at least part of the conical portion protrudes downward with respect to an inner upper surface of the container constituting the toner accommodating space.

According to another aspect of the invention, a developing apparatus includes (i) a container constituting a toner accommodating space configured to accommodate toner, (ii) a developing roller (ii-i) including a toner bearing portion to bear the toner accommodated in the toner accommodating space and (ii-ii) configured to rotate about a rotation axis, and (iii) a cyclonic separating portion configured to separate the toner and air, the cyclonic separating portion including (iii-i) an air intake for taking in the air with the toner to flow into the cyclonic separating portion, (iii-ii) a first discharge port through which the toner separated from the air is discharged into the toner accommodating space from the cyclonic separating portion, the first discharge port being provided in an area of the container between both ends of the toner bearing portion of the developing roller in a direction of the rotation axis, and (iii-iii) a second discharge port through which the air separated from the toner is discharged outside the container from the cyclonic separating portion.

According to another aspect of the invention, a n image forming apparatus includes a photosensitive drum, a toner storage portion configured to store toner and to be supplied with the toner by using air, a developing roller configured to rotate about a rotation axis, the developing roller including a toner bearing portion configured to bear the toner stored in the toner storage portion and supply the toner borne by the toner bearing portion to the photosensitive drum, and a cyclonic separating portion including an intake port, a first discharge port communicating with an interior of the toner storage portion, and a second discharge port communicating with an outside of the toner storage portion, the cyclonic separating portion being configured to take in the air mixed with the toner through the intake port, separate the toner and the air from each other, discharge the toner separated from the air through the first discharge port, and discharge the air separated from the toner through the second discharge port, wherein in a direction of the rotation axis, the first discharge port is disposed between positions of both ends of the toner bearing portion in the direction of the rotation axis.

Further features of the present invention will become apparent from the following description of exemplary embodiments with reference to the attached drawings.

BRIEF DESCRIPTION OF THE DRAWINGS

FIG. 8A is a cross-sectional view of the cartridge of the first embodiment.

FIG. 8B is a perspective view of the cartridge of the first embodiment.

FIG. 8C is an exploded perspective view of the cartridge of the first embodiment.

DESCRIPTION OF THE EMBODIMENTS

Hereinafter, some embodiments of the present disclosure will be described with reference to the accompanying drawings. In the following description, an X direction, a Y direction, and a Z direction are preferably orthogonal to each other.

First Embodiment

Figure 1:
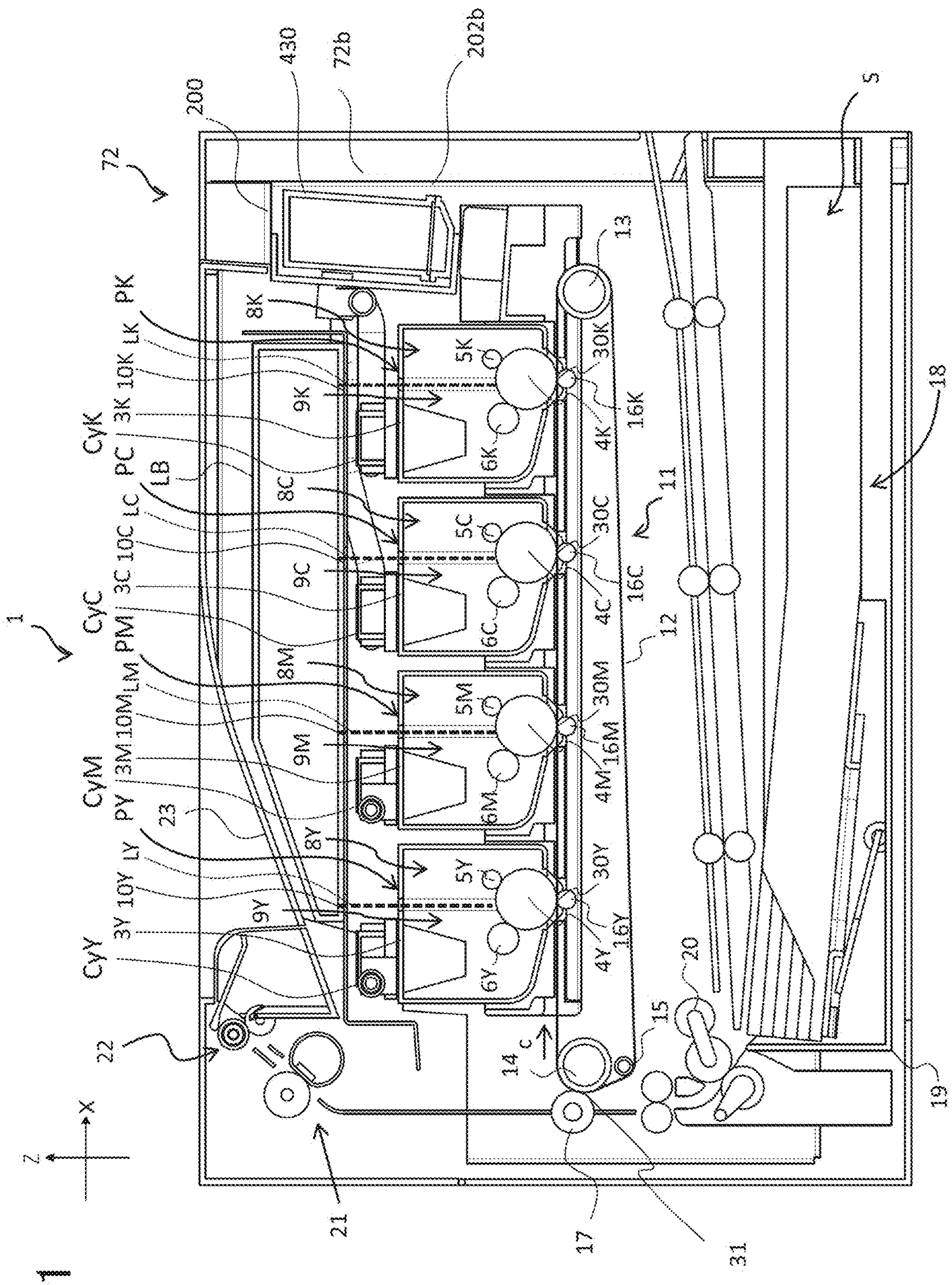
FIG. 1 is a schematic diagram of an image forming apparatus of a first embodiment.

An outline of an image forming apparatus 1 of a first embodiment will be described with reference to FIG. 1. FIG. 1 illustrates a cross section of the image forming apparatus 1, taken along a plane perpendicular to a main scanning direction (i.e., the rotation-axis direction of a photosensitive drum 4). The image forming apparatus 1 of the present embodiment is a full-color printer that can form a full-color image on a recording material S by using toners with four colors, as developer. The recording material (recording medium) S may be any one of a variety of sheets with different sizes and materials. For example, the recording material (recording medium) S may be a paper sheet, such as a plain paper sheet or a thick paper sheet, a sheet material, such as a coated paper sheet, on which certain surface treatment has been performed, a specially-shaped sheet material, such as an envelope or an index paper sheet, a plastic film, or a cloth sheet.

The image forming apparatus 1 includes process units PY, PM, PC, and PK (hereinafter referred to as each process unit P), and an apparatus body 72. Note that each process unit P is disposed so as to be arranged in a first direction (hereinafter referred to as the X direction), and colors of toners stored in the process units are different from each other. The longitudinal direction of each process unit P is a second direction (hereinafter referred to as the Y direction) perpendicular to the X direction. The process units PY, PM, PC, and PK are respectively defined as a first process unit, a second process unit, a third process unit, and a fourth process unit.

Each process unit P includes a process portion (i.e., a process component) for the electrophotographic process. The process portion is a unit that operates on the image bearing member or the recording material for performing any one of processes of the electrophotographic process: a charging process, an exposure process, a development process, a transfer process, a cleaning process, and a fixing process. To each process unit P, the rotational driving force is transmitted from a driving-force output portion of the apparatus body 72. In addition, to each process unit P, a bias voltage (such as a charging bias or a developing bias) is supplied from a power supply circuit of the apparatus body 72.

As illustrated in FIG. 1, the process units PY, PM, PC, and PK respectively include drum units 8Y, 8M, 8C, and 8K (hereinafter referred to as each drum unit 8). Each drum unit 8 includes a corresponding one of photosensitive drums 4Y, 4M, 4C, and 4K (hereinafter referred to as each photosensitive drum 4), and a corresponding one of charging rollers 5Y, 5M, 5C, and 5K (hereinafter referred to as each charging roller 5). Each charging roller 5 serves as a process portion that operates on a corresponding photosensitive drum 4. Each photosensitive drum 4 functions as an image bearing member that bears a latent image and a toner image. Each photosensitive drum 4 is an electrophotographic photoreceptor in which a photosensitive layer made of organic photosensitive material or the like is formed on the outer circumferential portion of a cylindrical base body. Each photosensitive drum 4 is disposed such that the rotation-axis direction of the photosensitive drum 4 is equal to the Y direction. The photosensitive drums 4Y, 4M, 4C, and 4K are respectively defined as a first photosensitive drum, a second photosensitive drum, a third photosensitive drum, and a fourth photosensitive drum.

Each process unit P includes a corresponding one of developing units 9Y, 9M, 9C, and 9K (hereinafter referred to as each developing unit 9). Each developing unit 9 includes a corresponding one of developing rollers 6Y, 6M, 6C, and 6K (hereinafter referred to as each developing roller 6). Each developing roller 6 develops the electrostatic latent image formed on a corresponding photosensitive drum 4. Each developing unit 9 is arranged in the X direction. The developing rollers 6Y, 6M, 6C, and 6K are respectively defined as a first developing roller, a second developing roller, a third developing roller, and a fourth developing roller. The developing units 9Y, 9M, 9C, and 9K are respectively defined as a first developing unit, a second developing unit, a third developing unit, and a fourth developing unit.

Each developing unit 9 includes a corresponding one of developer containers 3Y, 3M, 3C, and 3K (hereinafter referred to as each developer container 3). Each developer container 3 is a toner storage portion that stores toner used by a corresponding developing roller 6 for the development. Each developing roller 6 includes an outer circumferential surface that serves as a toner bearing portion that bears the toner stored in a corresponding developer container 3 (i.e., a toner storage portion). Each developing roller 6 is a developer bearing member that develops the latent image formed on a corresponding photosensitive drum 4 (i.e., an image bearing member), into a toner image by using the toner borne by the outer circumferential surface of the developing roller 6. Note that each developing roller 6 may be a cylindrical member (referred to also as a developing sleeve).

The developing unit 9Y includes the developer container 3Y (i.e., a first developer container) that stores toner (i.e., a first toner) with a color of yellow (Y). In the developing unit 9Y, the toner with the color of yellow is supplied to the surface of the photosensitive drum 4Y by the developing roller 6Y that bears the toner with the color of yellow. The developing unit 9M includes the developer container 3M (i.e., a second developer container) that stores toner (i.e., a second toner) with a color of magenta (M). In the developing unit 9M, the toner with the color of magenta is supplied to the surface of the photosensitive drum 4M by the developing roller 6M that bears the toner with the color of magenta. The developing unit 9C includes the developer container 3C (i.e., a third developer container) that stores toner (i.e., a third toner) with a color of cyan (C). In the developing unit 9C, the toner with the color of cyan is supplied to the surface of the photosensitive drum 4C by the developing roller 6C that bears the toner with the color of cyan. The developing unit 9K includes the developer container 3K (i.e., a fourth developer container) that stores toner (i.e., a fourth toner) with a color of black (K). In the developing unit 9K, the toner with the color of black is supplied to the surface of the photosensitive drum 4K by the developing roller 6K that bears the toner with the color of black.

A laser scanner unit LB (i.e., an exposure unit) is disposed above each process unit P (or each photosensitive drum 4) in a third direction (hereinafter referred to as the Z direction) that intersects both of the X direction and the Y direction. The laser scanner unit LB outputs a laser beam in accordance with image information. Hereinafter, the optical path of the laser beam toward the photosensitive drum 4Y is denoted by LY, the optical path of the laser beam toward the photosensitive drum 4M is denoted by LM, the optical path of the laser beam toward the photosensitive drum 4C is denoted by LC, and the optical path of the laser beam toward the photosensitive drum 4K is denoted by LK (hereinafter each of the optical paths is referred to as each optical path L or an optical path L). The laser beam passes through each of exposure windows 10Y, 10M, 10C, and 10K of the laser scanner unit LB, and scans and exposures the surface of a corresponding photosensitive drum 4. Note that instead of the laser scanner unit LB, an LED exposure unit may be used.

Preferably, the Z direction is parallel to the vertical direction (i.e., the gravity direction) defined with respect to the image forming apparatus 1 placed on a horizontal plane. In addition, unless otherwise specified, the downward direction is one direction of the Z direction (i.e., the lower direction in FIG. 1), and the upward direction is the other direction of the Z direction (i.e., the upper direction in FIG. 1).

Below the process unit P in the Z direction, an intermediate transfer belt unit 11 is disposed as a transfer member (i.e., an intermediate transfer unit). The intermediate transfer belt unit 11 includes a transfer belt 12, a driving roller 14, a tension roller 13, and an assist roller 15. The transfer belt 12 has flexibility, and is wound around the driving roller 14, the tension roller 13, and the assist roller 15.

The bottom surface of each photosensitive drum 4 is in contact with the top surface of the transfer belt 12. The contact portion between each photosensitive drum 4 and the transfer belt 12 serves as a corresponding one of primary transfer portions 30Y, 30M, 30C, and 30K (hereinafter referred to as a primary transfer portion 30). Inside the transfer belt 12, each of primary transfer rollers 16Y, 16M, 16C, and 16K (hereinafter referred to as a transfer roller 16) is disposed so as to face a corresponding photosensitive drum 4.

The driving roller 14 is pressed by a secondary transfer roller 17 via the transfer belt 12. The contact portion between the transfer belt 12 and the secondary transfer roller 17 serves as a secondary transfer portion 31.

A feeding unit 18 is disposed below the intermediate transfer belt unit 11 in the Z direction. The feeding unit 18 includes a feeding tray 19 that stores the recording material S stacked on the feeding tray 19, and a feeding roller 20 that picks up and conveys the recording material S from the feeding tray 19.

In FIG. 1, in an upper portion of the apparatus body 72, a fixing unit 21 and a discharging roller 22 are disposed. The fixing unit 21 fixes a toner image to the recording material S, and the discharging roller 22 discharges the recording material S, to which the toner image is fixed, to a discharging tray 23. The discharging roller 22 discharges the recording material S toward a direction along the X direction. Note that in the present embodiment, the downstream side in the discharging direction in which the recording material S is discharged toward the discharging tray 23 by the discharging roller 22 is defined as a front side of the image forming apparatus 1 or an FE side, and the upstream side in the discharging direction is defined as a back side of the image forming apparatus 1 or a BE side. In addition, the right side of the image forming apparatus 1 viewed from the front side is defined as a right side of the image forming apparatus 1 or an RE side, and the left side of the image forming apparatus 1 viewed from the front side is defined as a left side of the image forming apparatus 1 or an LE side. In the present embodiment, the RE side is one side of the Y direction, and the LE side is the other side of the Y direction opposite to the RE side.

Image Forming Operation

An image forming operation for forming a full-color image is as follows. Each photosensitive drum 4 is rotated counterclockwise in FIG. 1, at a predetermined speed. The transfer belt 12 is rotated at a speed that corresponds to the rotational speed of each photosensitive drum 4, in a direction (i.e., a direction indicated by an arrow C in FIG. 1) in which the transfer belt 12 rotates together with each photosensitive drum 4.

The laser scanner unit LB is also driven. In each process unit P, in synchronization with the driving of the laser scanner unit LB, the charging roller 5 uniformly charges the surface of a corresponding photosensitive drum 4 at a predetermined polarity and electric potential. The laser scanner unit LB scans and exposes the charged surface of each photosensitive drum 4, with the laser beam in accordance with an image signal for a corresponding color, and forms an electrostatic latent image on the surface of the photosensitive drum 4 in accordance with the image signal for the corresponding color. That is, the laser scanner unit LB exposes the photosensitive drum 4Y and the photosensitive drum 4M, and forms a first electrostatic latent image on the photosensitive drum 4Y and a second electrostatic latent image on the photosensitive drum 4M. Similarly, the laser scanner unit LB exposes the photosensitive drum 4C and the photosensitive drum 4K, and forms a third electrostatic latent image on the photosensitive drum 4C and a fourth electrostatic latent image on the photosensitive drum 4K.

The electrostatic latent image on each photosensitive drum 4 is developed by a corresponding developing roller 6, rotated clockwise in FIG. 1 at a predetermined speed, supplying the toner to the photosensitive drum 4. In the above-described electrophotographic image forming process, a toner image of yellow is formed on the photosensitive drum 4Y of the process unit PY. The toner image of yellow is primary-transferred onto the transfer belt 12. Similarly, a toner image of magenta is formed on the photosensitive drum 4M of the process unit PM. The toner image of magenta is primary-transferred onto the transfer belt 12 so as to be superposed on the toner image of yellow, which is formed on the transfer belt 12. Similarly, a toner image of cyan is formed on the photosensitive drum 4C of the process unit PC. The toner image of cyan is primary-transferred onto the transfer belt 12 so as to be superposed on the toner image of yellow and magenta, which is formed on the transfer belt 12. Similarly, a toner image of black is formed on the photosensitive drum 4K of the process unit PK. The toner image of black is primary-transferred onto the transfer belt 12 so as to be superposed on the toner image of yellow, magenta, and cyan, which is formed on the transfer belt 12.

In this manner, a full-color unfixed toner image of four colors of yellow, magenta, cyan, and black is formed on the transfer belt 12. On the other hand, the recording material S is separated, one by one, and fed from the feeding tray 19 by the feeding roller 20 at a predetermined control timing. The recording material S is introduced into the secondary transfer portion 31 at a predetermined control timing. The secondary transfer portion 31 is an abutment portion between the secondary transfer roller 17 and the transfer belt 12. In the process in which the recording material S is conveyed by the secondary transfer portion 31, the toner image which is formed on the transfer belt 12 and in which toner images of four colors are superposed on each other is transferred onto the recording material S. The recording material S onto which the toner image has been transferred is heated and pressed by the fixing unit 21, so that the toner image is fixed to the recording material S. The recording material S to which the toner image has been fixed is discharged to the discharging tray 23 by the discharge roller 22.

Cartridge

The image forming apparatus 1 includes cartridges 430Y, 430M, 430C, and 430K (hereinafter referred to as each cartridge 430), each of which serves as a supplying pack that can be attached to and detached from the apparatus body 72. Note that in the present embodiment, the apparatus body 72 is a portion of the image forming apparatus 1 left when the cartridges 430Y, 430M, 430C, and 430K are removed from the image forming apparatus 1. Each cartridge 430 is arranged in the Y direction. That is, each cartridge 430 is arranged in a direction that intersects (or crosses at right angles) the direction in which each developing unit 9 is arranged. The cartridges 430Y, 430M, 430C, and 430K are respectively defined as a first cartridge (i.e., a first toner container), a second cartridge (i.e., a second toner container), a third cartridge (i.e., a third toner container), and a fourth cartridge (i.e., a fourth toner container).

Figure 2A:
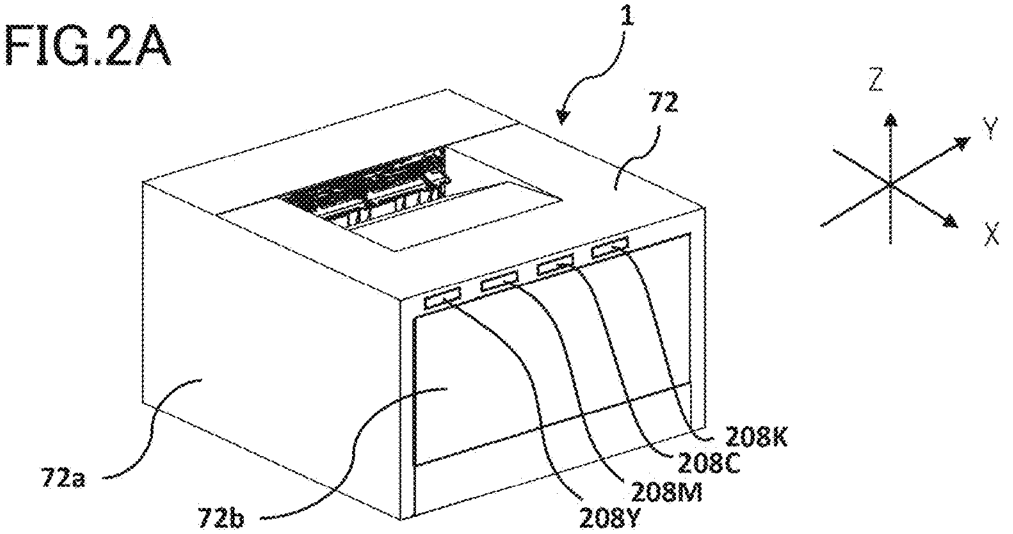
FIG. 2A is a perspective view of the image forming apparatus of the first embodiment.
Figure 2B:
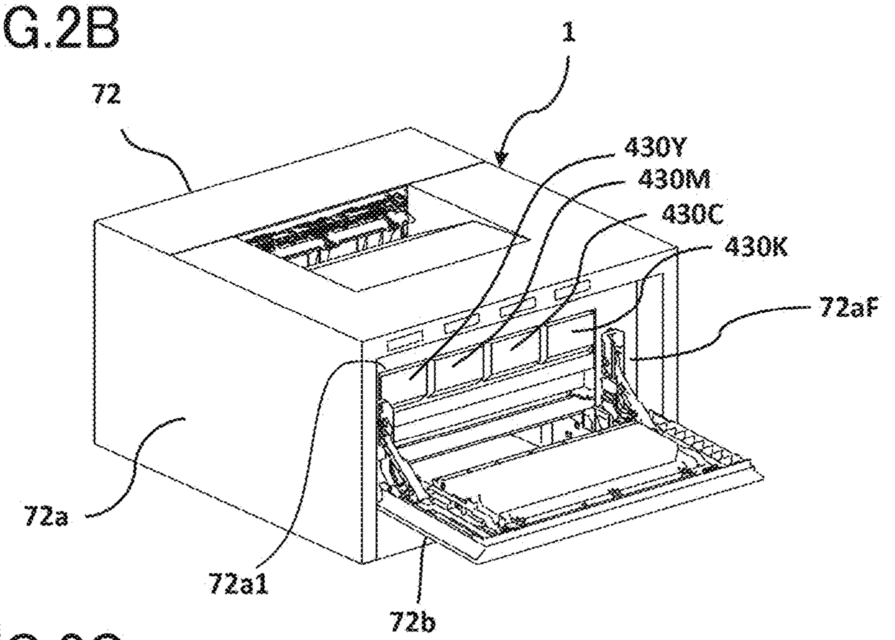
FIG. 2B is a perspective view of the image forming apparatus of the first embodiment.
Figure 2C:
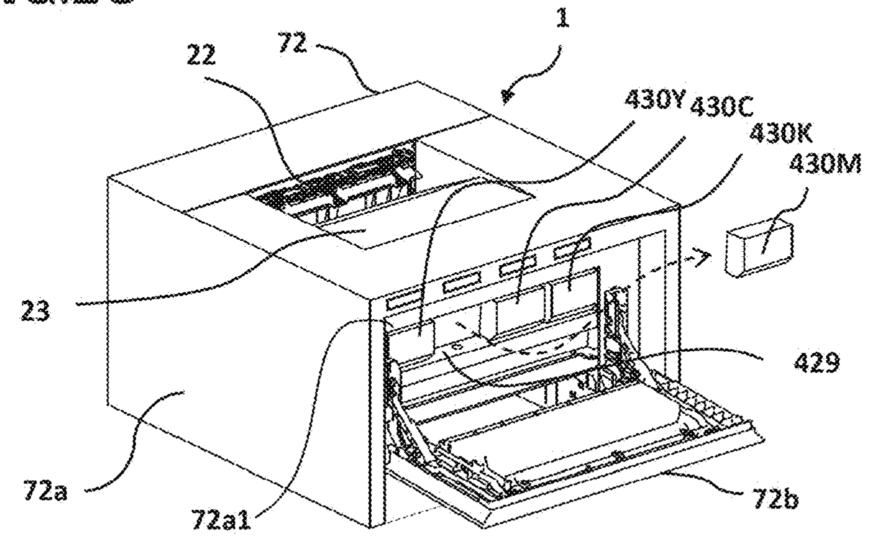
FIG. 2C is a perspective view of the image forming apparatus of the first embodiment.

FIG. 2A is a perspective view of the image forming apparatus 1 that is in a state where a front door 72*b* is closed. FIG. 2B is a perspective view of the image forming apparatus 1 that is in a state where the front door 72*b* is opened. FIG. 2C is a perspective view of the image forming apparatus 1 whose cartridge 430M is removed from a cartridge holder 429 in a state where the front door 72*b* is opened.

The apparatus body 72 includes a casing 72*a*, and the front door 72*b* that serves as an opening-and-closing member that can be opened and closed with respect to the casing 72*a*. The casing 72*a* contains each process unit P, the laser scanner unit LB, the intermediate transfer belt unit 11, the fixing unit 21, and the like. Each cartridge 430 is attached to an upper portion of the apparatus body 72 on the front side so that a user can access each cartridge 430 by opening the front door 72*b*. In other words, each cartridge 430 is disposed on an end portion of the casing 72*a* on the downstream side in the discharging direction of the discharging roller 22.

The front door 72*b* can be moved between a closing position (see FIG. 2A) in which the front door 72*b* closes an opening of the apparatus body 72 on the front side, and an opening position (see FIG. 2B) in which the front door 72*b* opens the opening. As illustrated in FIG. 2B, if the front door 72*b* is moved to the opening position, each cartridge 430 is exposed to the outside of the image forming apparatus 1 via the opening. Each cartridge 430 is disposed so as to be arranged in the Y direction, and as illustrated in FIG. 2C, can be attached to and detached from the apparatus body 72 in the X direction. In this configuration, the toner can be supplied to each process unit P without separating each process unit P from the apparatus body 72. Since each cartridge 430 is disposed on the front side of the image forming apparatus 1, a user can access each cartridge 430 from the front side, as in a case where the user collects the recording material S discharged to the discharging tray 23. In addition, since the cartridge holder 429 is disposed on the front side of the image forming apparatus 1, the process unit P is not exposed even after each cartridge 430 is removed (see FIG. 2C). In a state where the front door 72*b* is closed, each cartridge 430 is housed in a space formed in the apparatus body 72 (i.e., the space between the casing 72*a* and the front door 72*b*).

As illustrated in FIG. 2A, on the front side of the image forming apparatus 1, indicators (i.e., mark portions or display portions) 208Y, 208M, 208C, and 208K (hereinafter referred to as each indicator 208) of respective colors are disposed. Each indicator 208 is arranged in the Y direction, associated with a corresponding cartridge 430. The indicator 208Y (i.e., a first indicator) has a color of yellow, and the indicator 208M (i.e., a second indicator) has a color of magenta. The indicator 208C (i.e., a third indicator) has a color of cyan, and the indicator 208K (i.e., a fourth indicator) has a color of black. Each indicator 208 is an LED or a seal with a color that corresponds to the color of toner of a corresponding cartridge, and is disposed for preventing each cartridge 430 from being mistakenly attached to the apparatus body 72. In another case, each indicator 208 may have a function for displaying the toner remaining amount of a corresponding process unit P (i.e., a corresponding developing unit 9).

Image Forming Unit

Next, with reference to FIGS. 3A to 6, a toner conveyance mechanism from each cartridge 430 to a corresponding process unit P will be described.

A unit that includes each cartridge 430, each process unit P, and a below-described conveyance path for conveying the toner from each cartridge 430 to a corresponding process unit P is defined as an image forming unit 500.

Figure 3A:
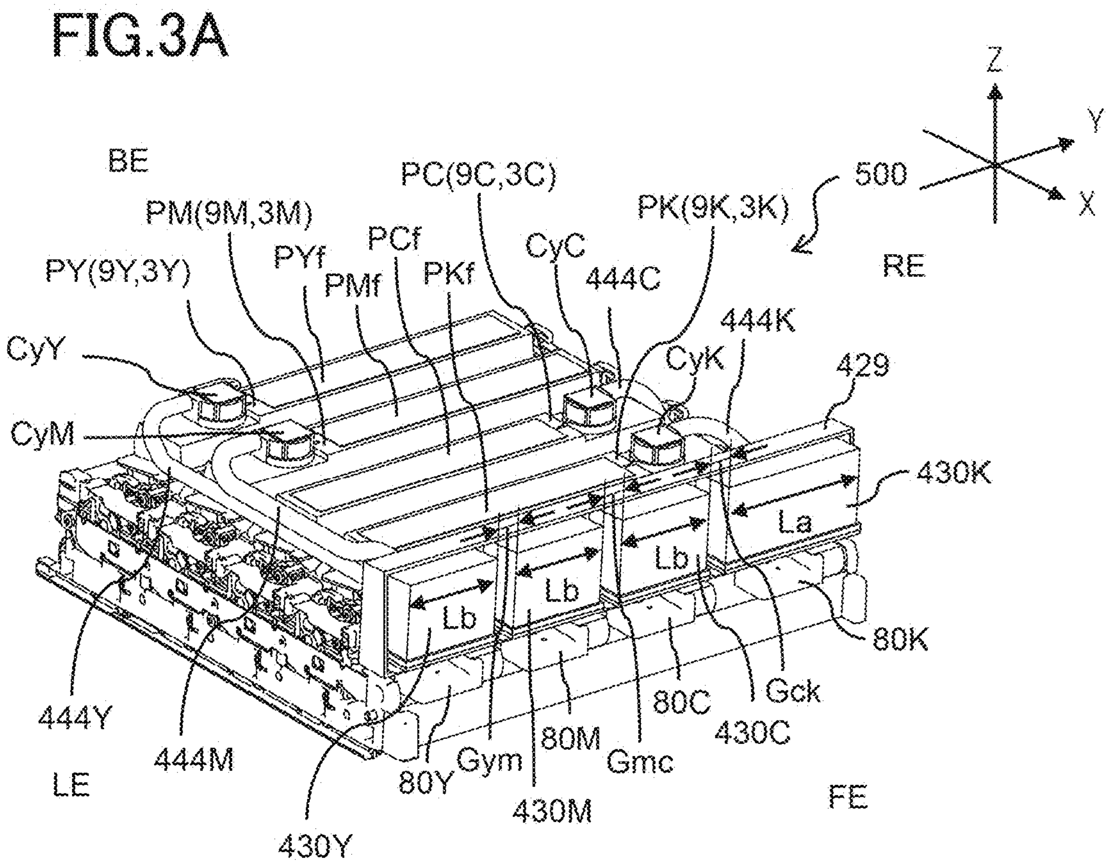
FIG. 3A is a perspective view of an image forming unit of the first embodiment.
Figure 3B:
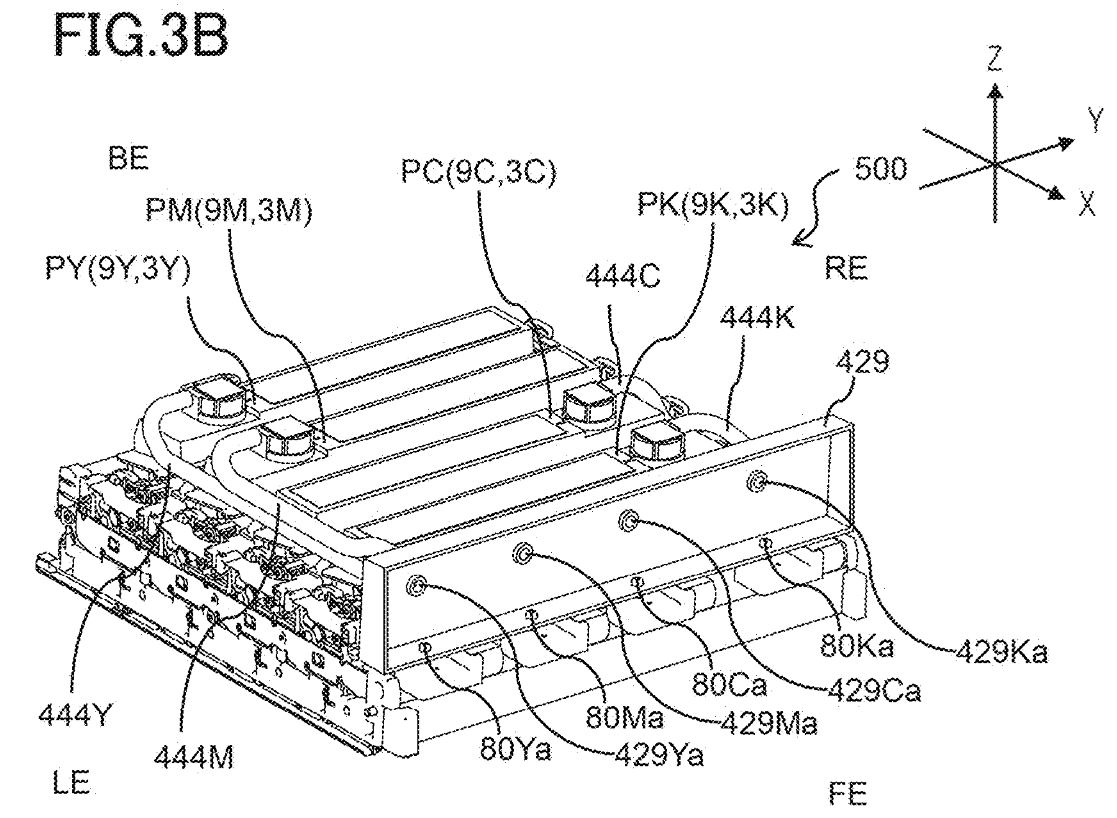
FIG. 3B is a perspective view of the image forming unit of the first embodiment.
Figure 4A:
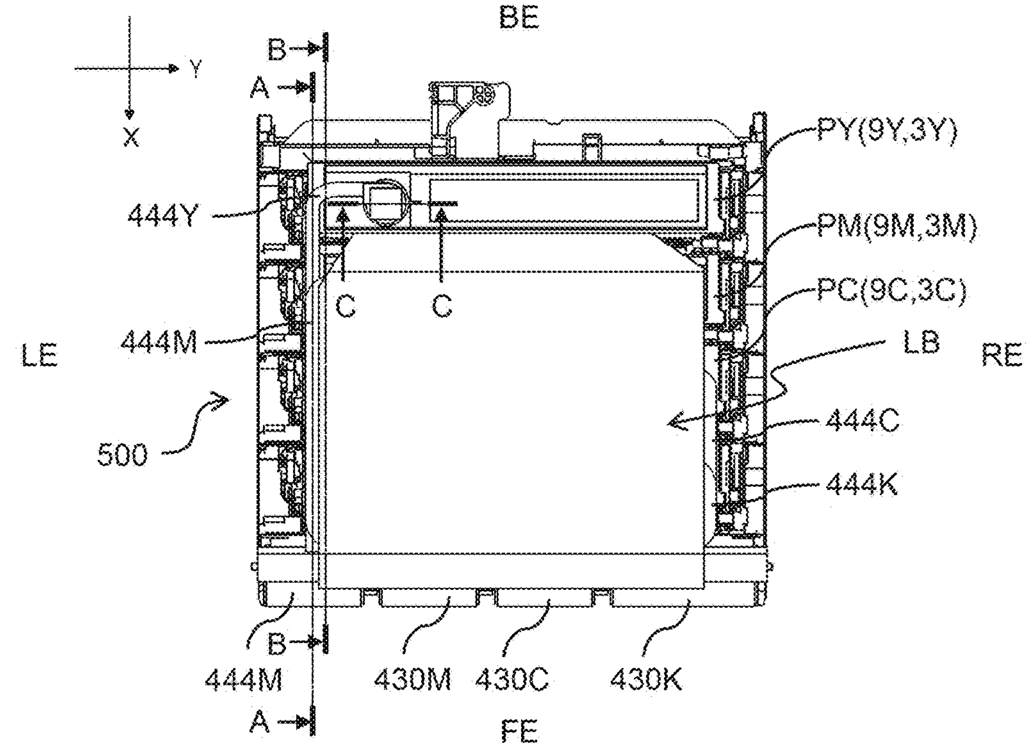
FIG. 4A is a top view of the image forming unit of the first embodiment.
Figure 4B:
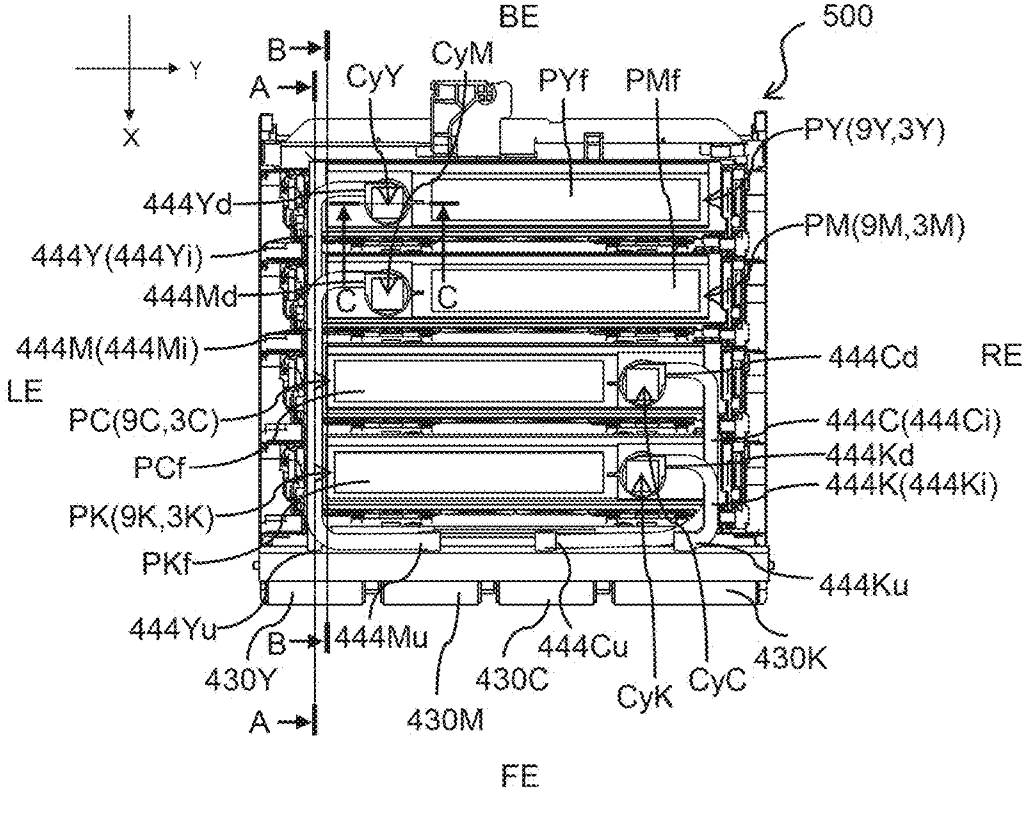
FIG. 4B is a top view of the image forming unit of the first embodiment.
Figure 5A:
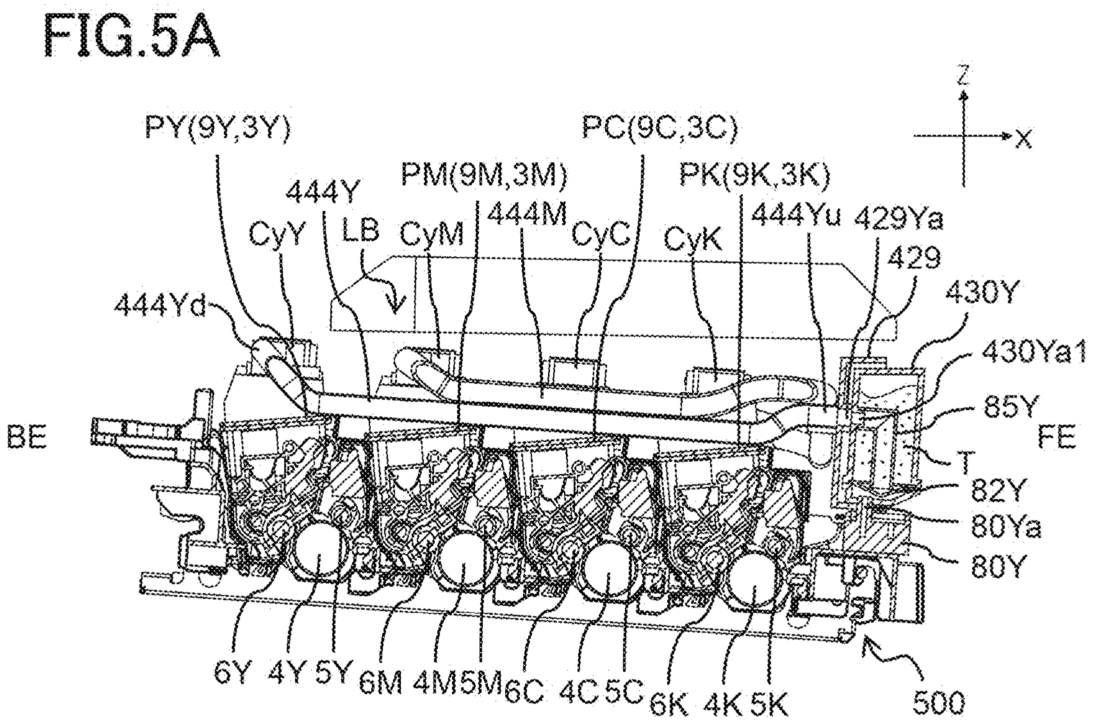
FIG. 5A is a cross-sectional view of the image forming unit of the first embodiment.
Figure 5B:
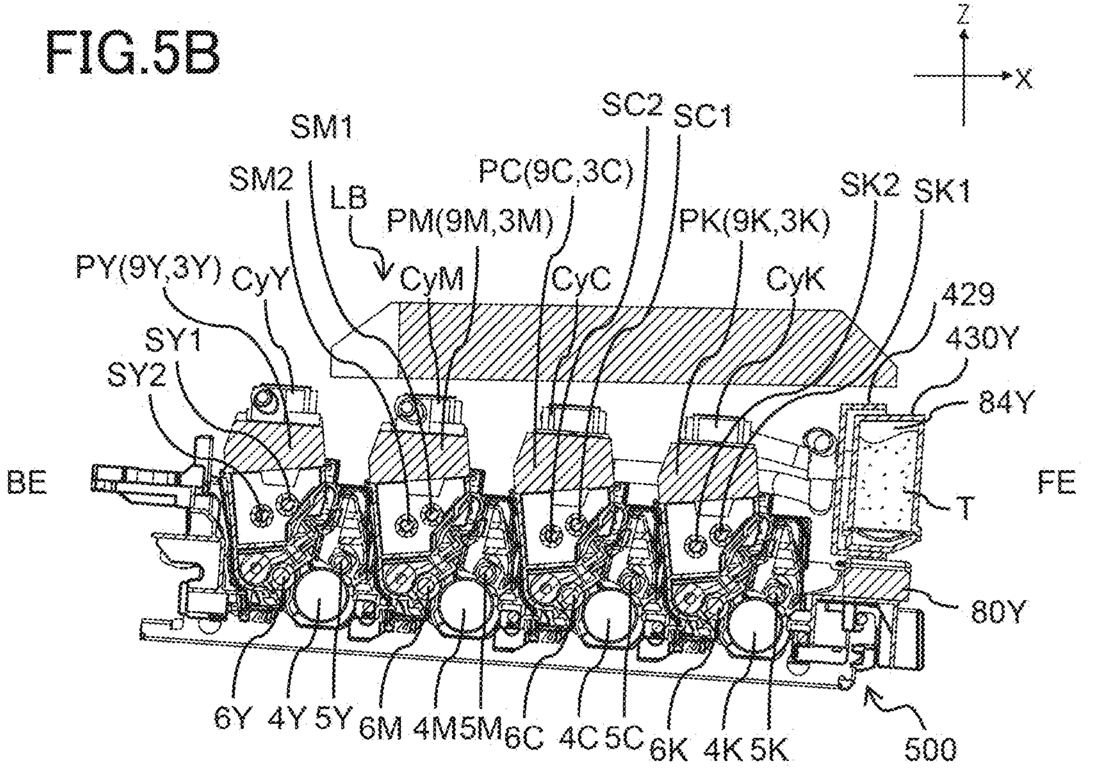
FIG. 5B is a cross-sectional view of the image forming unit of the first embodiment.

FIG. 3A is a perspective view of the image forming unit 500 that is in a state where each cartridge 430 is attached to the image forming unit 500. FIG. 3B is a perspective view of the image forming unit 500 that is in a state where each cartridge 430 is removed from the image forming unit 500. FIG. 4A is a top view of the laser scanner unit LB and the image forming unit 500. FIG. 4B is a top view of the image forming unit 500. FIG. 5A is a cross-sectional view taken along a line A-A of FIG. 4A, and FIG. 5B is a cross-sectional view taken along a line B-B of FIG. 4A.

As illustrated in FIG. 3A, pump units 80Y, 80M, 80C, and 80K (hereinafter referred to as each pump unit 80) are disposed below the cartridge holder 429. Each pump unit 80 is arranged in the Y direction. The pump units 80Y, 80M, 80C, and 80K are respectively defined as a first pump unit, a second pump unit, a third pump unit, and a fourth pump unit. Each pump unit 80 is a positive-displacement pump, such as a reciprocating pump or a rotary pump. The reciprocating pump performs suction and ejection by a component, such as a piston or a plunger, reciprocating; and examples of the reciprocating pump include a piston pump, a plunger pump, and a diaphragm pump. The rotary pump performs suction and ejection by a component, such as a gear or a rotor, rotating; and examples of the rotary pump include a gear pump, a screw pump, and a vane pump. Note that the four pump units may be formed as a single pump unit. Each pump unit 80 is disposed in the image forming unit 500 in the present embodiment, but may be disposed in a corresponding cartridge 430 or the apparatus body 72.

Note that the air discharged from each pump unit 80 may not be a gas that has the same composition as that of the atmosphere. For example, the air discharged from each pump unit 80 may be a gas obtained by removing steam or oxygen from the atmosphere. In another case, each pump unit 80 may discharge nitrogen, as the air, supplied from a tank that contains liquid nitrogen.

As illustrated in FIGS. 3B and 5A, in a portion of the cartridge holder 429 that faces the bottom surface of each cartridge 430, openings through which ejection ports 80Ya, 80Ma, 80Ca, and 80Ka (hereinafter referred to as each ejection port 80*a*) are exposed are formed. The air generated by each pump unit 80 is ejected from a corresponding ejection port 80*a*. Each ejection port 80*a* is opened toward the upward direction.

The air discharged upward from each ejection port 80*a* is supplied to the interior of a corresponding cartridge 430 attached to the cartridge holder 429. The air supplied to the interior of each cartridge 430 is discharged, together with toner, from the cartridge 430. That is, the air that contains toner (i.e., the air mixed with toner, or the mixed fluid that contains air and toner) is discharged from each cartridge 430. Note that the internal structure of each cartridge 430 will be described later, and thus the detailed description thereof is not made in this section.

The air discharged from each cartridge 430 and containing toner is taken in a corresponding one of supply pipes 444Y, 444M, 444C, and 444K via a corresponding one of taking-in ports 429Ya, 429Ma, 429Ca, and 429Ka formed in the cartridge holder 429 illustrated in FIG. 3B. Hereinafter, the taking-in ports 429Ya, 429Ma, 429Ca, and 429Ka are referred to as each taking-in port 429*a*. In addition, the supply pipes 444Y, 444M, 444C, and 444K are referred to as each supply pipe 444.

Each supply pipe 444 extends to a corresponding developing unit 9, and is connected to the developing unit 9. Each taking-in port 429*a* is a through hole formed so as to pass through a surface of the cartridge holder 429 that faces the back surface of a corresponding cartridge 430. Each taking-in port 429*a* is opened toward the X direction that is a direction in which each developing unit 9 is arranged. The direction toward which each taking-in port 429*a* is opened intersects the direction toward which each ejection port 80*a* is opened.

As illustrated in FIG. 4B, on the back side of a portion of the cartridge holder 429 in which each taking-in port 429*a* is formed, upstream end portions 444Yu, 444Mu, 444Cu, and 444Ku (hereinafter referred to as each upstream end portion 444*u*) of the supply pipes 444Y, 444M, 444C, and 444K are disposed. Each upstream end portion 444*u* is connected to the cartridge holder 429 so as to communicate with a corresponding taking-in port 429*a*.

The toner taken in from each taking-in port 429*a* is conveyed through the interior of a corresponding supply pipe 444 by the air discharged from a corresponding cartridge 430. The toner is moved from each upstream end portion 444*u* of a corresponding supply pipe 444 to a corresponding one of downstream end portions 444Yd, 444Md, 444Cd, and 444Kd (hereinafter referred to as each downstream end portion 444*d*), and is supplied to a corresponding developing unit 9.

Each developer container 3, which is a storage portion of a corresponding developing unit 9 for storing toner T, includes a corresponding one of cyclones CyY, CyM, CyC, and CyK (hereinafter referred to as each cyclone Cy) provided on the upper surface of the developer container 3. Each cyclone Cy supplies the toner T into a corresponding developer container 3 while separating air from the air supplied to the developer container 3 and containing the toner, and while discharging the separated air to the outside of the developer container 3. The developer container 3 and the cyclone Cy formed in the developer container 3 constitute a toner storage unit that is an example of a toner container. Note that the internal structure of each cyclone Cy will be described later, and thus the detailed description thereof is not made in this section.

Each downstream end portion 444*d* of a corresponding supply pipe 444 is connected to a corresponding cyclone Cy that is formed at an end portion of a corresponding developer container 3 in the Y direction. Specifically, the downstream end portion 444Yd of the supply pipe 444Y is connected to the cyclone CyY formed at an end portion of the developer container 3Y on the LE side, and the downstream end portion 444Md of the supply pipe 444M is connected to the cyclone CyM formed at an end portion of the developer container 3M on the LE side. In addition, the downstream end portion 444Cd of the supply pipe 444C is connected to the cyclone CyC formed at an end portion of the developer container 3C on the RE side, and the downstream end portion 444Kd of the supply pipe 444K is connected to the cyclone CyK formed at an end portion of the developer container 3K on the RE side.

Since each supply pipe 444 and a corresponding cyclone Cy are connected with each other in this manner, the length of each supply pipe 444 can be shortened, so that the pressure loss of each supply pipe 444 can be reduced. In addition, since the pressure loss is reduced, a small pump unit can be selected as each pump unit 80, and the image forming unit 500 can be downsized.

Figure 6:
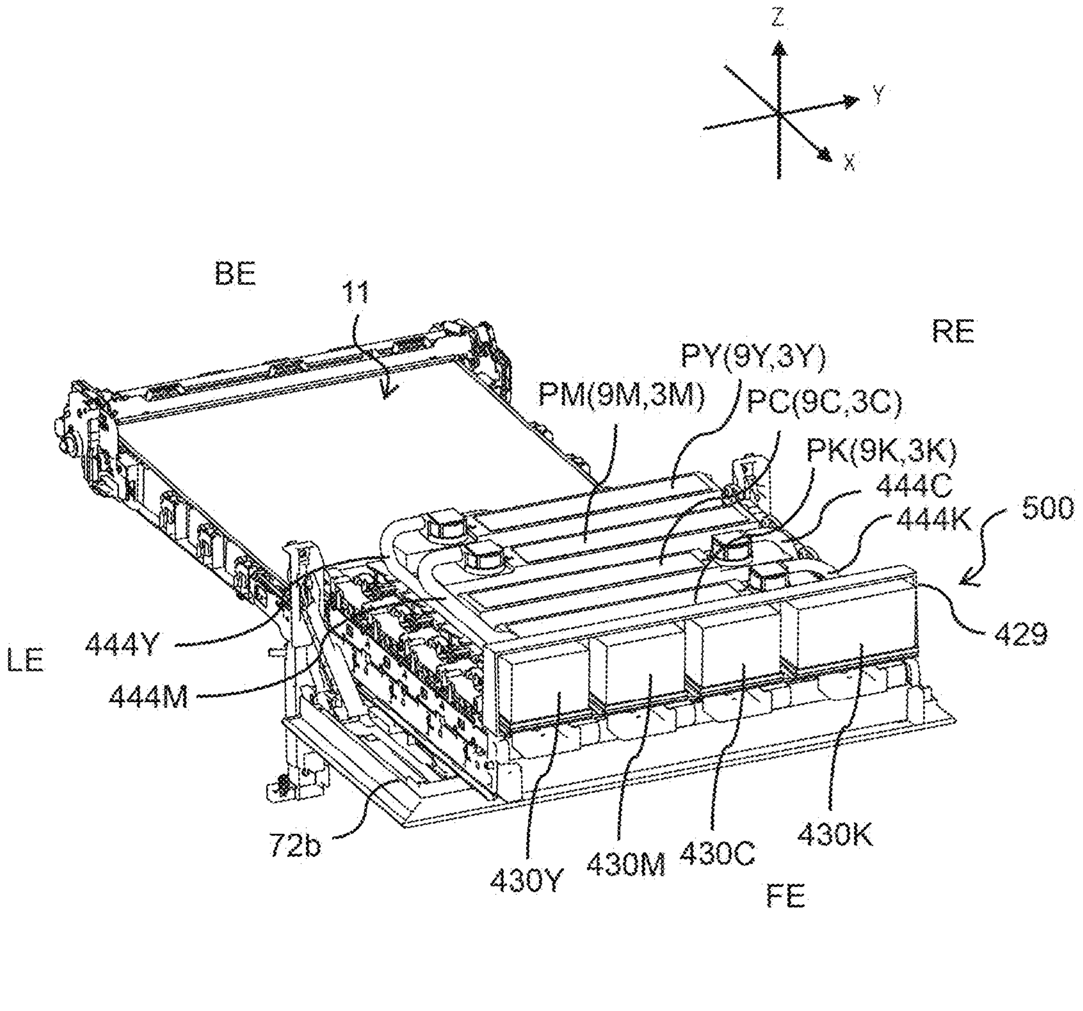
FIG. 6 is a diagram illustrating a state where the image forming unit of the first embodiment is pulled out.

Preferably, the image forming unit 500 is configured so that a user can easily access the process unit P and the supply pipe 444 for performing maintenance or replacement on the process unit P or the supply pipe 444, for providing service when the image forming unit 500 has failed. For this reason, in the present embodiment, the image forming unit 500 can be pulled out from the BE side (i.e., the back side) to the FE side (i.e., the front side), with respect to the apparatus body 72. In addition, in the present embodiment, the image forming unit 500 can be pulled out from the BE side (i.e., the back side) to the FE side (i.e., the front side), with respect to the intermediate transfer belt unit 11. FIG. 6 illustrates the image forming unit 500 that is in a state where the image forming unit 500 is pulled out from the apparatus body 72. Note that the image forming apparatus 1 may have a configuration in which the image forming unit 500 cannot be pulled out.

In addition, it is preferable that each cyclone Cy have a configuration that allows a user to easily access the cyclone Cy for maintenance. For this reason, in the present embodiment, when the image forming unit 500 is pulled out from the BE side (i.e., the back side) to the FE side (i.e., the front side), with respect to the apparatus body 72, each cyclone Cy is exposed to the outside of the apparatus body 72. That is, when the image forming unit 500 is pulled out toward the FE side, each cyclone Cy projects towards the FE side (i.e., the front side) through the opening 72*al* (FIG. 2B) formed in an end surface 72*a*F of the casing 72*a* on the FE side. Note that the opening 72*al* is formed in the end surface 72*a*F for allowing a user to pull out and insert the image forming unit 500. In addition, in the present embodiment, each cartridge 430 is attached to and detached from the apparatus body 72 through the opening 72*a*1.

Structure of Cartridge

Next, a structure of each cartridge 430 of the present embodiment will be described with reference to FIG. 3A and FIGS. 7A to 9B. Each cartridge 430 is an example of a toner container.

As illustrated in FIG. 3A, a width La of the cartridge 430K in the Y direction is larger than a width Lb of the cartridges 430Y, 430M, and 430C. Thus, the volume of the cartridge 430K for storing the toner is larger than the volume of each of the cartridges 430Y, 430M, and 430C. In general, the toner of black is consumed more than the toner of any other color. For this reason, the cartridge 430K is allowed to store the toner of black more than the toner of any other color. As a result, the number of times of replacement can be easily made equal for the cartridges 430Y, 430M, 430C, and 430K. Note that in the present embodiment, the cartridges 430Y, 430M, and 430C have the same width Lb in the Y direction. However, the cartridges 430Y, 430M, and 430C may have different widths in the Y direction.

Except for the difference in the width in the Y direction, each cartridge 430 has an identical structure. Thus, in the following description, the structure of the cartridge 430Y will be described, and the description for the structure of the cartridges 430M, 430C, and 430K will be omitted.

Figure 7A:
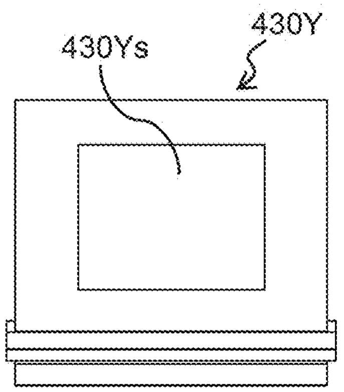
FIG. 7A is a front view of a cartridge of the first embodiment.
Figure 7B:
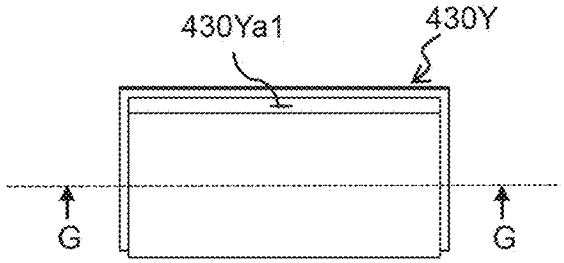
FIG. 7B is a top view of the cartridge of the first embodiment.
Figure 7C:
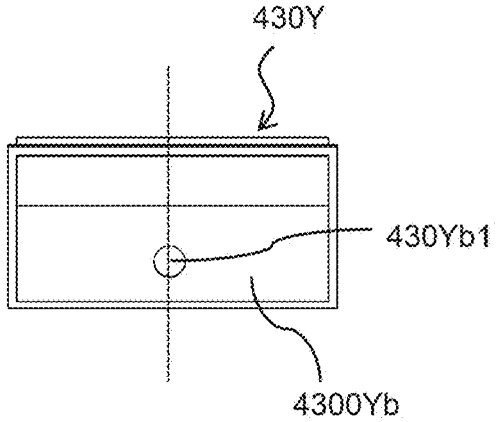
FIG. 7C is a bottom view of the cartridge of the first embodiment.
Figure 7D:
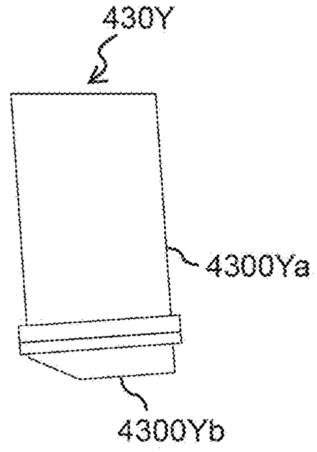
FIG. 7D is a side view of the cartridge of the first embodiment.
Figure 7E:
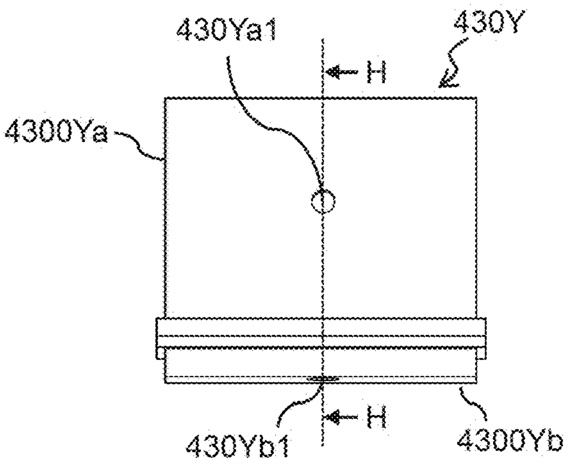
FIG. 7E is a back view of the cartridge of the first embodiment.
Figure 9A:
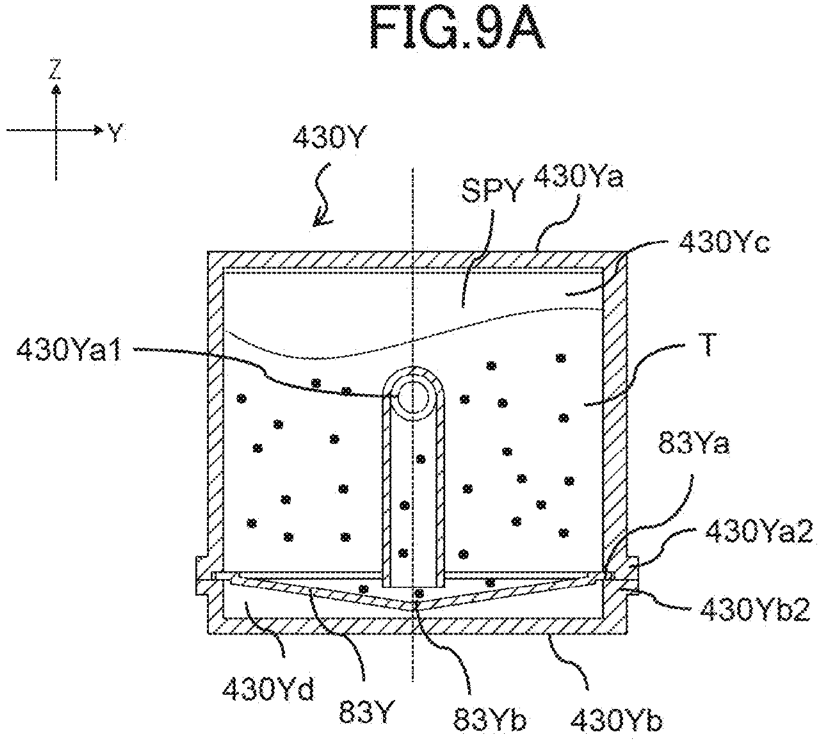
FIG. 9A is a cross-sectional view of the cartridge of the first embodiment.
Figure 9B:
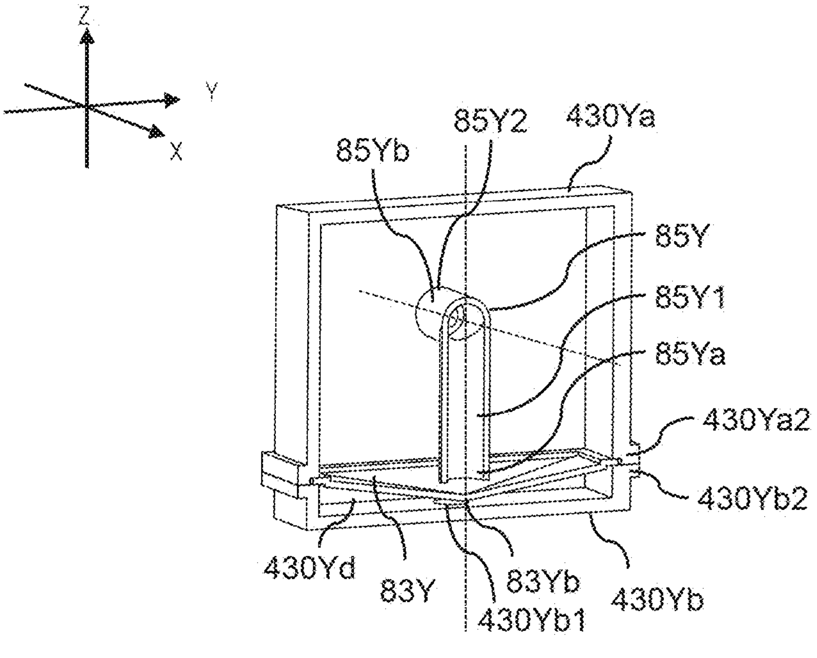
FIG. 9B is a perspective view of the cross section of the cartridge of the first embodiment.

FIG. 7A is a front view of the cartridge 430Y, FIG. 7B is a top view of the cartridge 430Y, FIG. 7C is a bottom view of the cartridge 430Y, FIG. 7D is a right side view of the cartridge 430Y, and FIG. 7E is a back view of the cartridge 430Y. FIG. 8A is a cross-sectional view taken along a line H-H of FIG. 7E. FIG. 8B is a perspective view of the cartridge 430Y. FIG. 8C is an exploded perspective view of the cartridge 430Y. FIG. 9A is a cross-sectional view taken along a line G-G of FIG. 7B. FIG. 9B is a perspective view of the cross section illustrated in FIG. 9A. Note that the following description for the structure of the cartridge 430Y will be made for the cartridge 430Y that is in a state (posture) where the cartridge 430Y is attached to the cartridge holder 429.

As illustrated in FIGS. 8A to 8C, the cartridge 430Y includes a first frame 430Ya, a second frame 430Yb, a filter 83Y (i.e., a first filter or a first air-permeable member), and a discharging pipe 85Y (i.e., a first discharging pipe or a first path). Although not illustrated in the figures, similar to the cartridge 430Y, the cartridge 430M includes a third frame that corresponds to the first frame 430Ya, and a fourth frame that corresponds to the second frame 430Yb. In addition, the cartridge 430M includes a filter (i.e., a second filter or a second air-permeable member) that corresponds to the filter 83Y, and a discharging pipe (i.e., a second discharging pipe or a second path) that corresponds to the discharging pipe 85Y. Similarly, the cartridge 430C includes a fifth frame that corresponds to the first frame 430Ya, and a sixth frame that corresponds to the second frame 430Yb. In addition, the cartridge 430C includes a filter (i.e., a third filter or a third air-permeable member) that corresponds to the filter 83Y, and a discharging pipe (i.e., a third discharging pipe or a third path) that corresponds to the discharging pipe 85Y. Similarly, the cartridge 430K includes a seventh frame that corresponds to the first frame 430Ya, and an eighth frame that corresponds to the second frame 430Yb. In addition, the cartridge 430K includes a filter (i.e., a fourth filter or a fourth air-permeable member) that corresponds to the filter 83Y, and a discharging pipe (i.e., a fourth discharging pipe or a fourth path) that corresponds to the discharging pipe 85Y.

The first frame 430Ya and the second frame 430Yb of the present embodiment are members made of resin. However, the first frame 430Ya and the second frame 430Yb may be made of another material such as paper. As illustrated in FIG. 7E, a discharge port 430Ya1 (i.e., a first discharge port) is formed in a back surface 4300Ya of the first frame 430Ya.

As illustrated in FIG. 7C, a taking-in port 430Yb1 (i.e., a first taking-in port or a first intake port) is formed in a bottom surface 4300Yb of the second frame 430Yb. Preferably, the discharge port 430Ya1 and the taking-in port 430Yb1 are formed in surfaces of the cartridge 430Y other than the surfaces (that face the Y direction) that the Y direction intersects (the Y direction is a direction in which each cartridge 430 is arranged). In this configuration, a clearance Gym between the cartridges 430Y and 430M, a clearance Gmc between the cartridges 430M and 430C, and a clearance Gck between the cartridges 430C and 430K, which are illustrated in FIG. 3A, can be made smaller. As a result, the width La or Lb of each cartridge 430 can be increased, so that the volume of each cartridge 430 for storing the toner can be increased. Note that the clearance Gym is a clearance between the cartridge 430Y and the cartridge 430M in the Y direction. The clearance Gmc is a clearance between the cartridge 430M and the cartridge 430C in the Y direction. The clearance Gck is a clearance between the cartridge 430C and the cartridge 430K in the Y direction.

The discharge port 430Ya1 is formed in the back surface 4300Ya of the cartridge 430Y (that is an end surface of the cartridge 430Y on the downstream side in the attachment direction) such that the discharge port 430Ya1 is opened toward the downstream side in the attachment direction. Thus, when the cartridge 430Y is attached to the cartridge holder 429, the discharge port 430Ya1 can be easily engaged with the taking-in port 429Ya of the cartridge holder 429 such that the discharge port 430Ya1 communicates with the taking-in port 429Ya. Note that the discharge port 430Ya1 may be formed in the bottom surface 4300Yb or the top surface of the cartridge 430Y, and that the taking-in port 430Yb1 may be formed in the back surface 4300Ya or the top surface. If the apparatus body 72 has sufficient space, the discharge port 430Ya1 and the taking-in port 430Yb1 may be formed in surfaces that the Y direction intersects. In addition, although not illustrated in the figures, the cartridge 430M includes a discharge port (i.e., a second discharge port) and a taking-in port (i.e., a second taking-in port or a second intake port) disposed like those of the cartridge 430Y. The cartridge 430C includes a discharge port (i.e., a third discharge port) and a taking-in port (i.e., a third taking-in port or a third intake port) disposed like those of the cartridge 430Y. The cartridge 430K includes a discharge port (i.e., a fourth discharge port) and a taking-in port (i.e., a fourth taking-in port or a fourth intake port) disposed like those of the cartridge 430Y.

In another case, a sealing member (i.e., a seal or a shutter), which is not illustrated in the figures, may be disposed on the discharge port 430Ya1. In this case, in a state where the cartridge 430Y is not attached to the cartridge holder 429 of the apparatus body 72, the sealing member seals the discharge port 430Ya1 and prevents the toner T stored in the cartridge 430Y, from leaking to the outside of the cartridge 430Y. When the cartridge 430Y is attached to the cartridge holder 429, the discharge port 430Ya1 is opened by the sealing member being removed or moved.

A label 430Ys of the cartridge 430Y illustrated in FIG. 7A and disposed on the front side is used for indicating the color of toner stored in the cartridge 430Y. The label 430Ys may be instructions illustrating how to attach the cartridge 430Y to the cartridge holder 429, or may display some kind of information on the cartridge 430Y.

As illustrated in FIGS. 8A to 8C, the first frame 430Ya includes a flange portion 430Ya2, and the second frame 430Yb includes a flange portion 430Yb2. The flange portion 430Ya2 and the flange portion 430Yb2 are welded to each other by using ultrasonic welding, so that an internal space SPY of the cartridge 430Y, illustrated in FIG. 8A, is formed. Note that the flange portion 430Ya2 and the flange portion 430Yb2 may be fixed to each other via adhesive or screws.

The filter 83Y is disposed so as to partition (or divide) the internal space SPY of the cartridge 430Y into two chambers: a toner chamber 430Yc (i.e., a first chamber) and an air chamber 430Yd (i.e., a second chamber). That is, the air chamber 430Yd is adjacent to the toner chamber 430Yc via the filter 83Y. Although not illustrated in the figures, the cartridge 430M includes a filter that partitions (or divides) the internal space of the cartridge 430M into two chambers: a toner chamber (i.e., a third chamber) and an air chamber (i.e., a fourth chamber). That is, the air chamber of the cartridge 430M is adjacent to the toner chamber via the filter. In addition, the cartridge 430C includes a filter that partitions (or divides) the internal space of the cartridge 430C into two chambers: a toner chamber (i.e., a fifth chamber) and an air chamber (i.e., a sixth chamber). That is, the air chamber of the cartridge 430C is adjacent to the toner chamber via the filter. In addition, the cartridge 430K includes a filter that partitions (or divides) the internal space of the cartridge 430K into two chambers: a toner chamber (i.e., a seventh chamber) and an air chamber (i.e., an eighth chamber). That is, the air chamber of the cartridge 430K is adjacent to the toner chamber via the filter.

The toner chamber 430Yc is positioned above the air chamber 430Yd, and the toner chamber 430Yc and the air chamber 430Yd are arranged in the Z direction. That is, the cartridge 430Y is attached to the apparatus body 72, with a posture and orientation in which the toner chamber 430Yc is positioned above the air chamber 430Yd. The direction in which the toner chamber 430Yc and the air chamber 430Yd are arranged is the Z direction. Thus, in the present embodiment, the taking-in port 430Yb1 is opened toward the arrangement direction, and the discharge port 430Ya1 is opened toward a direction that intersects the arrangement direction.

The toner chamber 430Yc stores the toner T. In the toner chamber 430Yc, the toner T is supported by the filter 83Y.

The toner is not stored in the air chamber 430Yd. For example, the filter 83Y is a porous member made of resin fiber, and the size and density of pores are determined so as to allow the passage of air and prevent the passage of toner. That is, the filter 83Y is made so as to allow the passage of air and prevent the passage of toner. As illustrated in FIGS. 8 and 9, the filter 83Y is held by the first frame 430Ya and the second frame 430Yb such that an outer edge portion 83Ya of the filter 83Y is sandwiched between the flange portion 430Ya2 of the first frame 430Ya and the flange portion 430Yb2 of the second frame 430Yb. The filter 83Y is sloped from the outer edge portion 83Ya toward a lowermost portion 83Yb positioned below the outer edge portion 83Ya. That is, the filter 83Y includes a portion (i.e., a sloped portion) that extends downward as the portion extends toward (or closer to) the lowermost portion 83Yb in the X direction, the Y direction, or a horizontal direction.

The lowermost portion 83Yb is a portion that projects with respect to the outer edge portion 83Ya, in a direction extending from the toner chamber 430Yc toward the air chamber 430Yd. As illustrated in FIGS. 8A and 9B, the lowermost portion 83Yb is positioned in a center portion of the filter 83Y in the X direction and the Y direction. The filter 83Y is molded so as to have the above-described shape.

In the toner chamber 430Yc, the discharging pipe 85Y (i.e., a path) is disposed. The discharging pipe 85Y of the present embodiment is a member made of resin. However, the discharging pipe 85Y may be made of another material such as paper or rubber. The discharging pipe 85Y includes an inlet 85Ya (i.e., a first opening) and an outlet 85Yb (i.e., a second opening), and extends from the inlet 85Ya to the outlet 85Yb. The discharging pipe 85Y is a path through which the toner T stored in the toner chamber 430Yc passes when the toner T is moved toward the discharge port 430Ya1. The discharging pipe 85Y includes a first portion 85Y1 which extends in the Z direction and in which the inlet 85Ya is disposed, and a second portion 85Y2 which extends in the X direction and in which the outlet 85Yb is disposed. The direction in which the first portion 85Y1 extends and the direction in which the second portion 85Y2 extends intersect each other (the directions are orthogonal to each other in the present embodiment).

The outlet 85Yb of the discharging pipe 85Y is connected with the discharge port 430Ya1 so as to communicate with the discharge port 430Ya1. The inlet 85Ya of the discharging pipe 85Y is disposed so as to face the lowermost portion 83Yb, which is a portion of the filter 83Y, via a clearance. Preferably, the inlet 85Ya is disposed closer to the filter 83Y. If the mount of the toner T that remains in the toner chamber 430Yc decreases, the toner T is fluidized by the air taken in through the taking-in port 430Yb1, and moves along the above-described slope of the filter 83Y and aggregates on the lowermost portion 83Yb. The inlet 85Ya of the discharging pipe 85Y can guide the toner T that aggregates on the lowermost portion 83Yb of the filter 83Y, to the discharge port 430Ya1. With this operation, even in a case where the amount of remaining toner stored in the toner chamber 430Yc of the cartridge 430Y decreases, the toner T can be efficiently discharged to the outside of the cartridge 430Y.

Since the cartridge of the present embodiment has the structure in which the toner is discharged to the outside of the cartridge by the air, the cartridge does not need any rotary member such as a screw. Thus, the structure of the cartridge can be simplified, having less components.

Structure of Cyclone

Next, a structure of each cyclone Cy of the present embodiment will be described with reference to FIGS. 10 and 11. Since the structure of each cyclone Cy is the same as each other except for the direction in which the toner flows into each cyclone Cy, the structure of the cyclone CyY will be described below and the description of the structure of the cyclones CyM, CyC, and CyK will be omitted.

Figure 10A:
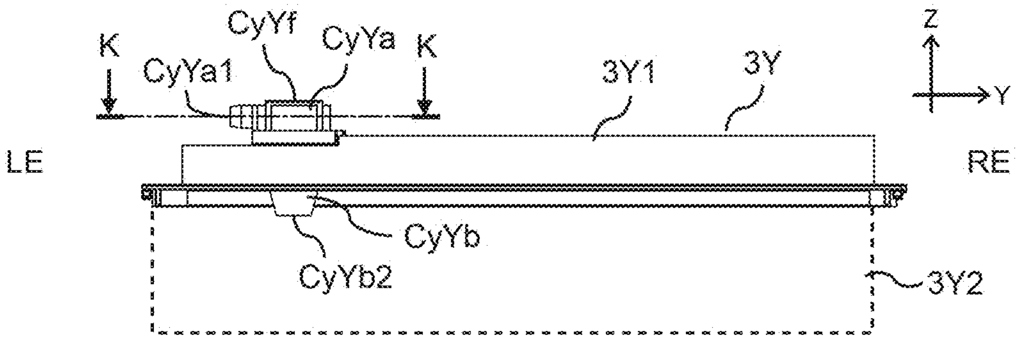
FIG. 10A is a front view of a cyclone of the first embodiment.
Figure 10B:
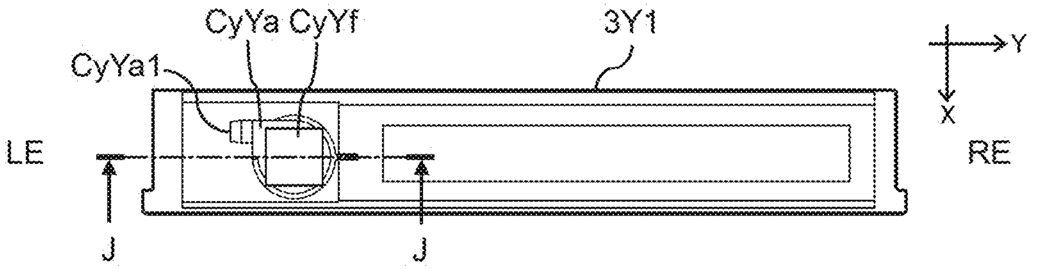
FIG. 10B is a top view of the cyclone of the first embodiment.
Figure 10C:
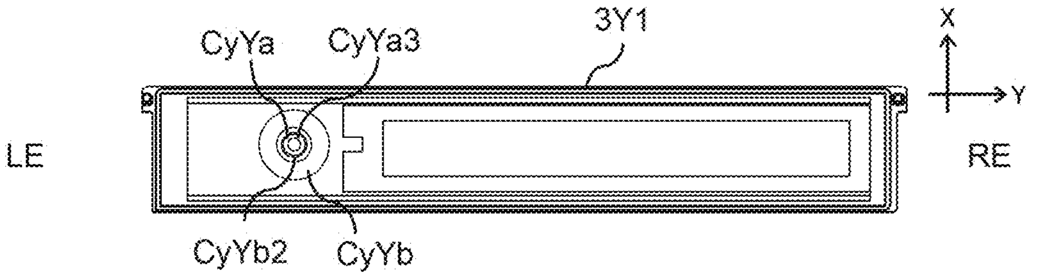
FIG. 10C is a bottom view of the cyclone of the first embodiment.
Figure 10D:
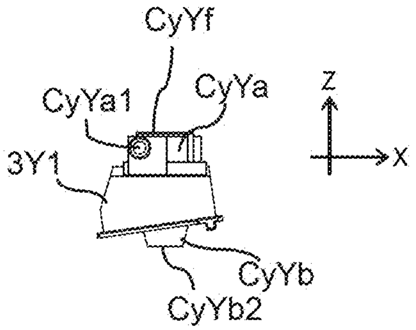
FIG. 10D is a left side view of the cyclone of the first embodiment.
Figure 10E:
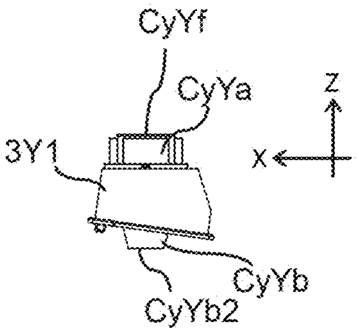
FIG. 10E is a right side view of the cyclone of the first embodiment.
Figure 11A:
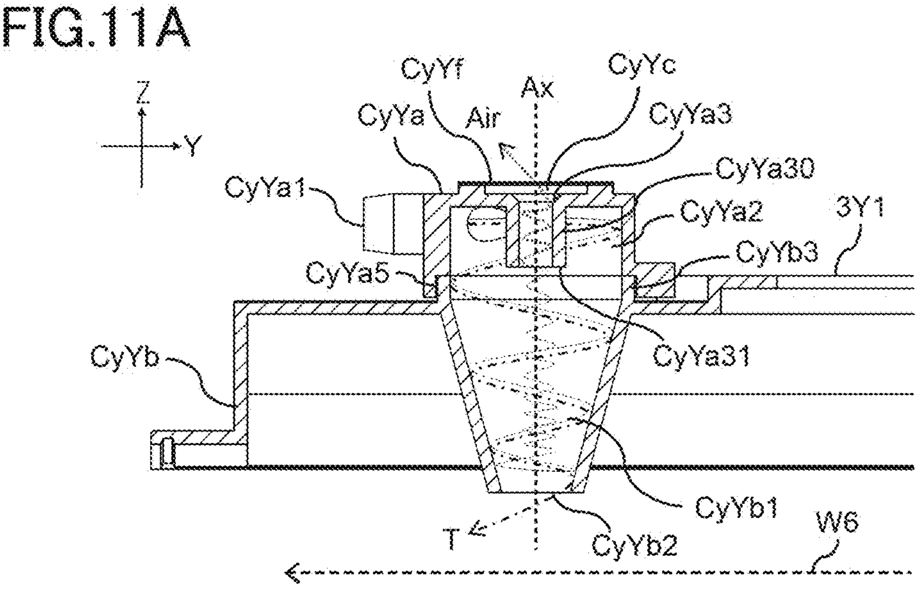
FIG. 11A is a cross-sectional view of the cyclone of the first embodiment.
Figure 11B:
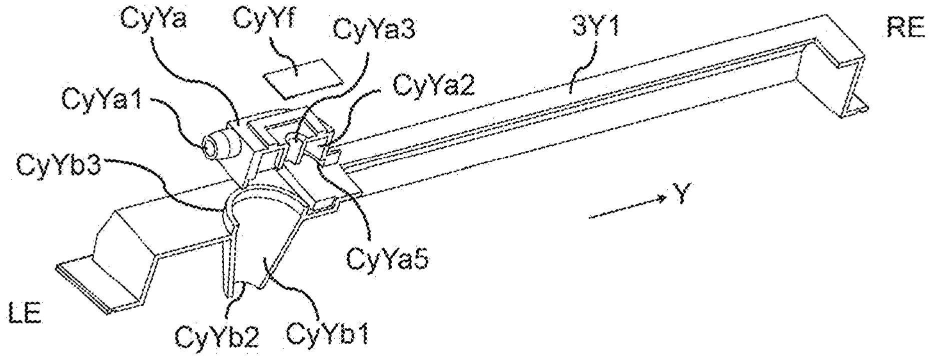
FIG. 11B is an exploded perspective view of the cyclone of the first embodiment.
Figure 11C:
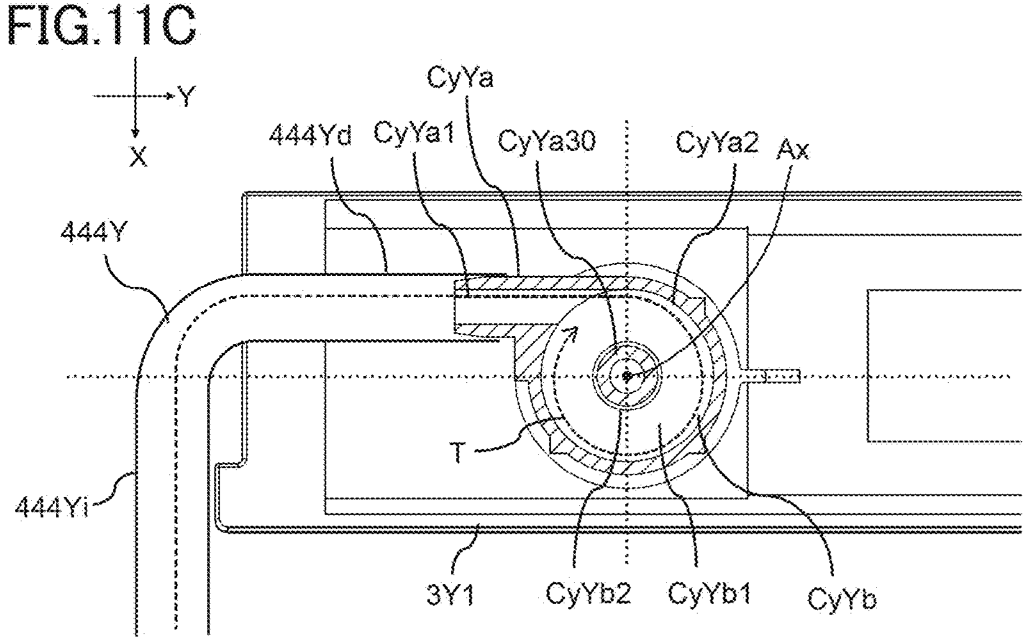
FIG. 11C is a cross-sectional view of the cyclone of the first embodiment.

FIG. 10A is a front view of the cyclone CyY, FIG. 10B is a top view of the cyclone CyY, FIG. 10C is a bottom view of the cyclone CyY, FIG. 10D is a left side view of the cyclone CyY, and FIG. 10E is a right side view of the cyclone CyY. FIG. 11A is a cross-sectional view taken along a line J-J of FIG. 10B. FIG. 11B is an exploded perspective view illustrating the cross section of the cyclone CyY, taken along the line J-J. FIG. 11C is a cross-sectional view taken along a line K-K of FIG. 10A. Note that the following description for the structure of the cyclone CyY will be made for the cyclone CyY that is in a state (posture) where the cyclone CyY is attached to the apparatus body 72. FIG. 10A schematically illustrates the developer container 3Y (i.e., a toner storage portion) that is supplied with toner via the cyclone CyY. In FIG. 11A, an imaginary straight line is illustrated for showing a center axis Ax of a conical portion CyYb1. In FIG. 11C, an imaginary straight line that passes through the center axis Ax and extends in the X direction and an imaginary straight line that passes through the center axis Ax and extends in the Y direction are illustrated. These imaginary straight lines serve as references for showing an example of arrangement of components related to the cyclone CyY.

The developing unit 9Y is attached to the apparatus body 72 in an orientation (posture) in which the inner diameter of the conical portion CyYb1 decreases as the center axis Ax of the conical portion CyYb1 extends in the gravity direction and toward the downward direction. That is, the following description for the cyclone CyY and FIGS. 10A to 10E and FIGS. 11A to 11C will be made for the toner storage portion that is oriented in a direction in which the inner diameter of the conical portion CyY decreases as the center axis Ax of the conical portion CyYb1 extends in the gravity direction and toward the downward direction.

As illustrated in FIGS. 10A to 10E and FIGS. 11A to 11C, the cyclone CyY includes a cylindrical member CyYa (i.e., an upper member or a taking-in member) that serves as a first member, a conical frustum member CyYb (i.e., a lower member or a discharging member) that serves as a second member, and an air discharge filter CyYf. The cylindrical member CyYa includes an inflow port CyYa1, a cylindrical portion CyYa2, and an air discharge port CyYa3. The conical frustum member CyYb includes a conical portion CyYb1 and a toner discharge port CyYb2.

The cyclone CyY is a separation apparatus (i.e., a cyclonic separating portion or a centrifugal separator) that takes in air that contains air and toner to be supplied to the developer container 3Y (i.e., a toner storage portion), and that centrifugally separates the toner from the air. The cyclone CyY includes the toner discharge port CyYb2 that serves as a first discharge port that discharges the toner to the internal space of the toner storage portion, and the air discharge port CyYa3 that serves as a second discharge port that discharges the air to the space outside the toner storage portion.

The cyclone CyY takes in the air that contains toner, through the inflow port CyYa1; and performs the centrifugal separation by producing whirl flow of the air in the internal space of the cylindrical portion CyYa2 and the conical portion CyYb1. The cylindrical portion CyYa2 and the conical portion CyYb1 are a main-body portion of the cyclone CyY that forms a space in which the whirl flow of the air that contains toner is produced. The cyclone CyY discharges toner separated from the air by performing the centrifugal separation, from the toner discharge port CyYb2; and discharges air separated from the toner by performing the centrifugal separation, from the air discharge port CyYa3 and the air discharge filter CyYf.

In the following description, the direction along the center axis Ax of the conical portion CyYb1 formed in a conical frustum shape is defined as an axial direction (i.e., an axis direction) of the cyclone CyY. In the present embodiment, the axial direction of the cyclone CyY is substantially parallel with the Z direction (i.e., the gravity direction). However, the cyclone CyY may be disposed such that the axial direction obliquely crosses the Z direction. In addition, a radial direction of an imaginary circle whose center is the center axis Ax when the cyclone CyY is viewed in the axial direction is defined as a radial direction of the cyclone CyY.

The cyclone CyY of the present embodiment is tangential, and thus the inflow port CyYa1 is connected so as to be in contact with the outer wall of the cylindrical portion CyYa2. That is, as illustrated in FIG. 11C, the radius of the cylindrical portion CyYa2 with respect to the center axis Ax is constant. In addition, a wall surface of the inflow port CyYa1 that is more separated from the center axis Ax in the radial direction extends along a tangent of the cylindrical portion CyYa2 in a connection portion CyYa12 (i.e., a boundary portion) formed between the inflow port CyYa1 and the cylindrical portion CyYa2.

The cyclone CyY may not be tangential, and the radius of the cylindrical portion CyYa2 may not be constant. For example, the cyclone CyY may be hemispiral or spiral. In a case where the cyclone CyY is hemispiral, the radius of the cylindrical portion CyYa2 decreases gradually from the connection portion between the cylindrical portion CyYa2 and the inflow port CyYa1, in a range of 180 degrees around the center axis Ax. In a case where the cyclone CyY is spiral, the radius of the cylindrical portion CyYa2 decreases gradually from the connection portion between the cylindrical portion CyYa2 and the inflow port CyYa1, in a range of 360 degrees around the center axis Ax.

As illustrated in FIGS. 11A and 11B, the cylindrical portion CyYa2 of the cylindrical member CyYa and the conical portion CyYb1 of the conical frustum member CyYb are arranged in the Z direction. The bottom portion of the cylindrical portion CyYa2 is connected with the top portion of the conical portion CyYb1. The cylindrical portion CyYa2 is formed in a cylinder shape whose center is the center axis Ax that extends in the Z direction. The conical portion CyYb1 is formed in a conical frustum shape whose center is the center axis Ax and whose radius decreases as the conical frustum shape extends downward. The toner discharge port CyYb2 (i.e., a first discharge port) is formed at the lower end (i.e., the lower end portion) of the conical portion CyYb1.

The bottom portion of the cylindrical member CyYa and the upper surface portion of the conical frustum member CyYb are fixed to each other without any gap so that the toner does not leak from the connection portion between the cylindrical portion CyYa2 and the conical portion CyYb1, to the outside of the cyclone CyY and the developer container 3Y. The fixing is performed, for example, by using adhesive, but may be performed by using ultrasonic welding or screws. More specifically, in the present embodiment, an annular projecting portion CyYb3 (FIGS. 11A and 11B) formed on the top portion of the conical frustum member CyYb is fit in an annular recess portion CyYa5 formed in the bottom portion of the cylindrical member CyYa. The upper end surface of the projecting portion CyYb3 is in contact with the upper end surface of the recess portion CyYa5, and the outer surface of the projecting portion CyYb3 formed in the radial direction faces the inner surface of the recess portion CyYa5 formed in the radial direction. Thus, since the cylindrical member CyYa and the conical frustum member CyYb are fixed to each other such that a portion of the cylindrical portion CyYa2 and a portion of the conical portion CyYb1 overlap with each other in the Z direction, the toner leakage can be more reliably reduced. Note that a recess portion may be formed in the top portion of the conical frustum member CyYb, and that a projecting portion to be fit in the recess portion may be formed on the bottom portion of the cylindrical member CyYa.

The inflow port CyYa1 is an intake port (i.e., an air intake, a taking-in portion or a taking-in port) that takes in the air that contains toner. The inflow port CyYa1 is a tubular portion that extends along a tangential direction passing through a point on the inner wall of the cylindrical portion CyYa2 illustrated in FIG. 11C. The inflow port CyYa1 of the present embodiment extends from an edge position, positioned in the X direction, of the inner wall of the cylindrical portion CyYa2, toward one side (i.e., the LE side) in the Y direction. The inflow port CyYa1 is opened toward the direction from a center portion of the corresponding developing roller 6Y, toward an end portion of the developing roller 6Y (the center portion and the end portion of the developing roller 6Y are formed in the direction of the rotation-axis direction of the developing roller 6Y).

The air discharge port CyYa3 is an opening portion (i.e., a second discharge port) that communicates with the outside of the developer container 3Y (i.e., a toner storage portion). The air discharge port CyYa3 is an opening portion for discharging air, obtained by separating toner from the mixed air, to the outside of the cyclone CyY. The air discharge port CyYa3 is disposed in a top portion (i.e., an upper end portion or an upper end surface) of the cylindrical portion CyYa2. The air discharge port CyYa3 of the present embodiment is opened in the upper surface of the cylindrical portion CyYa2. The air discharge port CyYa3 of the present embodiment is opened upward. The air discharge port CyYa3 of the present embodiment is positioned above the upper surface (i.e., the outer surface of a lid member 3Y1) of the developer container 3Y (i.e., a toner storage portion).

The air discharge port CyYa3 is disposed in an upper end (i.e., a second end) of a tubular portion CyYa30 that extends downward from the upper surface of the cylindrical portion CyYa2 along the center axis Ax. A lower end CyYa31 (i.e., a first end) of the tubular portion CyYa30, in which the air discharge port CyYa3 is disposed, is opened in the space inside the cylindrical portion CyYa2 and the conical portion CyYb1 (see also FIG. 13). The lower end CyYa31 of the tubular portion CyYa30 is positioned below the inner upper surface of the internal space of the developer container 3Y (i.e., the lower surface of the lid member 3Y1), and above the toner discharge port CyYb2 (i.e., a first discharge port) of the cyclone CyY. That is, the cyclone CyY of the present embodiment includes the tubular portion CyYa30 that extends downward from the air discharge port CyYa3 (i.e., a second discharge port). The lower end CyYa31 of the tubular portion CyYa30 is opened in the internal space of the cyclone CyY, formed by the cylindrical portion CyYa2 and the conical portion CyYb1. In addition, at least a portion of the tubular portion CyYa30 is positioned at the same position as the position of the inflow port CyYa1 in the direction of the center axis Ax. In other words, at least a portion of the tubular portion CyYa30 is disposed at a position at which the at least a portion of the tubular portion CyYa30 overlaps with the inflow port CyYa1 when viewed in a direction orthogonal to the center axis Ax.

The above-described tubular portion CyYa30 has a function to prevent the airflow which has flowed from the inflow port CyYa1 into the internal space of the cyclone CyY along the inner wall of the cylindrical portion CyYa2, and from which the toner has still not been centrifuged, from approaching the air discharge port CyYa3. By this function, the below-described clogging prevention effect of the air discharge filter CyYf can be further increased. However, the tubular portion CyYa30 may not be disposed. This is because the air mixed with toner easily moves downward due to the self weight of the toner and hardly moves toward the air discharge port CyYa3 (or the air discharge filter CyYf), which is disposed in a higher position. The air discharge filter CyYf is attached to the upper surface of the cylindrical member CyYa. The air discharge filter CyYf is disposed so as to cover the air discharge port CyYa3 when viewed from above, and allows the air to be discharged from the air discharge port CyYa3 and collects the toner. That is, the air discharge filter CyYf allows the passage of the air, and prevents the passage of the toner. In addition, a space (i.e., a chamber) formed by a chamber portion CyYc is disposed between the air discharge port CyYa3 and the air discharge filter CyYf. The chamber portion CyYc has a recess shape in which a portion (that includes a circumferential edge of the air discharge port CyYa3) of the upper surface of the cylindrical member CyYa is recessed downward. The chamber is formed as a space surrounded by the recess-shaped bottom portion, a portion that extends upward around the bottom portion (the portion is a portion to which the air discharge filter CyYf is attached), and the air discharge filter CyYf.

The area of a cross section (at a plane perpendicular to the Z direction) of the space (i.e., a chamber) formed by the chamber portion CyYc is larger than the area of a cross section of the air discharge port CyYa3 obtained in a plane perpendicular to the Z direction. That is, the cross-sectional area of a cross section of the space (formed by the chamber portion CyYc) perpendicular to the direction in which the tubular portion CyYa30, which has the air discharge port CyYa3 formed in the upper end of the tubular portion CyYa30, extends is larger than the cross-sectional area of a cross section of the tubular portion CyYa30 perpendicular to the direction in which the tubular portion CyYa30 extends. Thus, the effective surface area of the air discharge filter CyYf can be made larger than that of an air discharge filter CyYf disposed in a configuration in which the air discharge port CyYa3 directly faces the air discharge filter CyYf. The effective surface area of the air discharge filter CyYf is the area of a portion of the air discharge filter CyYf through which the air passes from the interior of the cyclone CyY to the outside of the cyclone CyY. If the total amount of toner particles that adhere to the air discharge filter CyYf is constant, the air discharge filter CyYf having a larger effective surface area is less clogged. The effective surface area of the air discharge filter CyYf in the present embodiment is a surface area of a portion of the air discharge filter CyYf that is exposed to the chamber portion CyYc.

The toner discharge port CyYb2 is an opening portion (i.e., a first discharge port) that communicates with the interior of the developer container 3Y (i.e., a toner storage portion). The toner discharge port CyYb2 is an opening portion for discharging the toner separated from the air, to the outside of the cyclone CyY. The toner discharge port CyYb2 is formed at the lower end of the conical portion CyYb1. The toner discharge port CyYb2 of the present embodiment is formed in a circle whose center is the center axis Ax. The toner discharge port CyYb2 is opened in the space inside the developer container 3Y (i.e., a storage space or toner accommodating space in which the toner used for image formation is stored or accommodated) (FIG. 10A). The toner discharge port CyYb2 of the present embodiment is opened downward. The toner discharge port CyYb2 of the present embodiment is positioned below an inner upper surface (i.e., the inner surface of the lid member 3Y1) of the interior of the developer container 3Y (i.e., a toner storage portion).

In the present embodiment, the conical frustum member CyYb of the cyclone CyY and the lid member 3Y1 (FIG. 11B), which forms the upper surface of the developer container 3Y, are formed integrally with each other, by using resin. That is, in the present embodiment, at least the conical portion CyYb1 of the cyclone CyY is formed integrally with the upper surface portion of the developer container 3Y (i.e., a toner storage portion). Being formed integrally with each other means being formed as a single component by using a method, such as injection molding or cutting of resin material. Thus, the conical frustum member CyYb and the lid member 3Y1 may be a component that is integrally formed by using a single resin material.

In the present embodiment, the developer container 3Y includes a main-body frame 3Y2 (FIG. 10A) that has a shape opened upward, and the lid member 3Y1 that covers the top portion of the main-body frame 3Y2. The storage space for storing the toner is formed between the main-body frame 3Y2 and the lid member 3Y1. Since the conical frustum member CyYb of the cyclone CyY and the lid member 3Y1 are formed integrally with each other, the configuration for supplying the toner to the developer container 3Y via the cyclone CyY can be simplified, having less number of components. Note that the conical frustum member CyYb may be formed as a component different from the lid member 3Y1. In this case, the conical frustum member CyYb may be fixed to the lid member 3Y1 by using adhesive or another method.

In the present embodiment, the position of the toner discharge port CyYb2 of the cyclone CyY in the Y direction is positioned inside an area (hereinafter referred to as a width area W6 of the developing roller 6Y) (see also FIGS. 11A and 13) in which the developing roller 6Y is disposed in the Y direction. The width area W6 of the developing roller 6Y is a range from one end to the other end of the outer circumferential surface of the developing roller 6Y (by which the toner is borne) in the Y direction. In other words, in each developing unit 9, in the direction of the rotation axis of the developing roller 6 (i.e., the rotation-axis direction of the developing roller 6), the first discharge port of the cyclone Cy is disposed at a position between positions of both ends of the outer circumferential surface (i.e., a toner bearing portion) of the developing roller 6 in the direction of the rotation axis of the developing roller 6. With such arrangement, the efficiency of toner conveyance can be increased, as described below.

In addition, in the present embodiment, the cyclone CyY is disposed in an upper surface portion of the developer container 3Y (i.e., a toner storage portion). The upper surface portion of the developer container 3Y is a surface (that faces upward in the Z direction) of the developer container 3Y included in a top view of the developer container 3Y. Since the cyclone CyY is disposed in the upper surface portion of the developer container 3Y, the cyclone CyY and the developer container 3Y have a positional relationship in which the cyclone CyY and the internal space of the developer container 3Y overlap with each other when viewed in the Z direction. Thus, the area taken by the developing unit 9Y when viewed in the Z direction can be reduced, compared with the area, taken by the developing unit 9Y when viewed in the Z direction, in a positional relationship in which the cyclone CyY protrudes from the internal space of the developer container 3Y in the X direction or the Y direction when viewed in the Z direction. As a result, the apparatus can be downsized. Note that the sentence of "two components overlap with each other when viewed in a certain direction" means that when the components are vertically projected onto an imaginary plane orthogonal to the certain direction, a projected area of one component and a projected area of the other component at least partly overlap with each other.

In addition, in the present embodiment, when viewed in the Z direction, the toner discharge port CyYb2 of the cyclone CyY overlaps with an outer circumferential surface 6Ya (FIG. 13) of the developing roller 6Y. In other words, in the rotation-axis direction, the first discharge port is positioned between positions of both ends of the outer circumferential surface (i.e., a toner bearing portion) of the developing roller in the rotation-axis direction of the developing roller; and the first discharge port of the cyclone and the outer circumferential surface (i.e., a toner bearing portion) of the developing roller overlap with each other when viewed in the gravity direction. In this configuration, since the outer circumferential surface 6Ya of the developing roller 6Y is positioned directly below the toner discharge port CyYb2, the toner discharged from the toner discharge port CyYb2 can more easily reach the outer circumferential surface 6Ya of the developing roller 6Y. That is, the efficiency of toner conveyance can be further increased.

However, the toner discharge port CyYb2 and the outer circumferential surface 6Ya of the developing roller 6Y may have a positional relationship in which the toner discharge port CyYb2 and the outer circumferential surface 6Ya of the developing roller 6Y do not overlap with each other when viewed in the gravity direction. In this case, since the toner is conveyed in the X direction by agitating members SY1 and SY2 disposed in the developer container 3Y, the toner is supplied to the outer circumferential surface 6Ya of the developing roller 6Y. In another case, the developing unit 9Y may further include a supplying roller that supplies the toner to the developing roller 6Y.

In addition, in the present embodiment, the conical portion CyYb1 of the cyclone CyY projects downward with respect to an inner surface 3Y1*a* (FIG. 13) of the upper surface portion (i.e., the lid member 3Y1) of the developer container 3Y. In other words, the cyclone CyY is disposed in the upper surface portion of the developer container 3Y (i.e., a toner storage portion), and a portion of the cyclone CyY is buried in a portion of the toner storage portion below the upper surface portion of the toner storage portion. In other words, at least a portion of the conical portion CyYb1 projects downward with respect to the inner upper surface (i.e., the inner surface 3Y1*a*) of the interior of the developer container 3Y (i.e., a toner storage portion). With this configuration, the developing unit 9Y can be downsized in the Z direction. That is, the height taken by the cyclone CyY and the developer container 3Y in the Z direction is made smaller than the height taken by the cyclone CyY and the developer container 3Y in the Z direction in a configuration in which the whole of the cyclone CyY is disposed on the upper side of the upper surface portion of the developer container 3Y. Note that in the present embodiment, the whole of the conical portion CyYb1 projects downward with respect to the inner surface 3Y1*a* of the lid member 3Y1. However, only a portion of the conical portion CyYb1 may project downward with respect to the inner surface 3Y1*a* of the lid member 3Y1.

Note that the conical portion CyYb1 may be shortened for downsizing the developing unit 9Y. However, if the conical portion CyYb1 is shortened, the separation performance of the cyclone CyY may deteriorate. In the configuration of the present embodiment, since it is not necessary to extremely shorten the conical portion CyYb1, keeping the separation performance of the cyclone CyY and downsizing the developing unit 9Y can be both achieved.

Toner Conveyance Mechanism

Next, the mechanism that conveys the toner stored in the toner chamber 430Yc of the cartridge 430Y, to the developing unit 9Y will be described.

As illustrated in FIG. 5A, the air ejected from the ejection port 80Ya of the pump unit 80Y is taken in the air chamber 430Yd through the taking-in port 430Yb1 of the cartridge 430Y. Then the air increases the air pressure of the air chamber 430Yd, passes through the filter 83Y, and flows into the toner chamber 430Yc. The air that has flowed into the toner chamber 430Yc enters the space among particles of the toner T, and fluidizes the toner T. The toner T that has been mixed with the air and fluidized is moved by the air that is taken in the air chamber 430Yd through the taking-in port 430Yb1. The toner is moved from the inlet 85Ya to the outlet 85Yb through the discharging pipe 85Y, and is discharged from the discharge port 430Ya1 to the outside of the cartridge 430Y.

Since the air chamber 430Yd that is a space with high airtightness is formed between the ejection port 80Ya and the filter 83Y, the air ejected from the ejection port 80Ya flows efficiently to the filter 83Y without dispersing to the outside of the cartridge 430Y. For example, if the cartridge 430Y is vibrated or left for a long time, the toner T in the toner chamber 430Yc aggregates. In such a case, a higher pressure may be required for causing the air to pass though the filter 83Y and flow into the toner chamber 430Yc. Even in this case, the air is allowed to pass through the filter 83Y and flow into the toner chamber 430Yc, by continuously sending air from the pump unit 80Y into the air chamber 430Yd and increasing the pressure (i.e., air pressure) of the air chamber 430Yd. In addition, since the air chamber 430Yd is formed, the pump unit 80Y has only to have performance that produces the pressure that can continuously send air into the air chamber 430Yd until the pressure has a value that allows the air to pass through the filter 83Y into the toner chamber 430Yc. That is, the pump unit 80Y does not need particular performance for the ejection speed and the ejection rate. Thus, a small pump unit can be used as the pump unit 80Y, contributing to the downsizing of the apparatus.

As illustrated in FIG. 5A, the toner T discharged from the discharge port 430Ya1 of the cartridge 430Y enters the interior of the supply pipe 444Y from an upstream end portion 444Yu, through the taking-in port 429Ya of the cartridge holder 429. The toner T that has entered the interior of the supply pipe 444Y from the upstream end portion 444 Yu is moved to a downstream end portion 444Yd by the air that has been discharged from the discharge port 430Ya1 of the cartridge 430Y and has entered the upstream end portion 444Yu, like the toner T. The toner T that has been moved to the downstream end portion 444Yd flows into the cyclone CyY through the inflow port CyYa1, together with the air.

As illustrated in FIGS. 11A and 11C, the air that contains toner and that has flowed into the cyclone CyY moves down while whirling around the center axis Ax, inside the cylindrical portion CyYa2 and the conical portion CyYb1. In this process, the toner T is moved by the centrifugal force so as to approach the inner wall of the cylindrical portion CyYa2 and the inner wall of the conical portion CyYb1; and is moved along the inner wall. The cross-sectional area of the conical portion CyYb1 decreases as the air that contains the toner T moves closer to the toner discharge port CyYb2. Thus, while the toner Tis continuously moved along the inner wall of the conical portion CyYb1 by the centrifugal force, the air whose specific gravity is smaller than that of the toner T is pushed toward the center side of the cylindrical portion CyYa2 and the conical portion CyYb1. The air pushed in this manner flows along the center axis Ax, toward the air discharge port CyYa3 that communicates with the space outside the cyclone CyY. As a result, by the time the air that contains the toner T reaches the vicinity of the toner discharge port CyYb2, most of the air turns and becomes the ascending air current, and is discharged to the outside of the developer container 3Y through the air discharge port CyYa3, the chamber portion CyYc, and the air discharge filter CyYf. Note that if an air-discharge filter portion PYf (FIG. 3) is disposed, as described later, in the developer container 3Y, and the developer container 3Y is not airtight, part of the air is discharged from the toner discharge port CyYb2 to the developer container 3Y.

On the other hand, even in the vicinity of the toner discharge port CyYb2, the toner T continues to move down, while whirling, due to the self weight of the toner T, and is discharged from the toner discharge port CyYb2 and stored in the storage space formed in the developer container 3Y. In this manner, the toner T is supplied from the cartridge 430Y to the developing unit 9Y of the process unit PY.

As described above, the toner is supplied to the developing unit 9Y in a state where most of the air is separated from the toner T by the cyclone CyY. That is, in the present embodiment, the toner can be supplied to the developer container 3Y (i.e., a toner storage portion) in a state where the toner is separated from the air. Thus, the separation performance can be kept for a longer time, compared with the separation performance in a configuration in which the toner is separated from the air, mainly by a filter.

In the present embodiment, since the toner T is supplied to the developing unit 9Y in a state where most of the air is separated from toner T by the cyclone CyY, it is possible to reduce the increase of the internal pressure of the developing unit 9Y caused by the inflow of the air. Since the increase of the internal pressure of the developing unit 9Y is reduced, toner leakage from the developing unit 9Y (e.g., flying of the toner T and the air from an opening portion of the developer container 3Y in which the developing roller 6Y is disposed) can be prevented. In addition, since the increase of the internal pressure of the developing unit 9Y is reduced, the load for driving the pump unit 80Y hardly increases. As a result, a pump unit such as a smaller pump unit can be used as the pump unit 80Y, contributing to the downsizing of the apparatus.

In the present embodiment, since the air from which most of the toner T has been separated is discharged from the air discharge port CyYa3, the air discharge filter CyYf is hardly clogged with the toner T, so that the durability of the toner conveyance function from the toner container to the developer container is increased.

In addition, as illustrated in FIG. 3, for increasing the discharging performance for discharging the air to the outside of the developing unit 9, each of air-discharge filter portions PYf, PMf, PCf, and PKf (i.e., other filters) may be disposed on the upper surface of a corresponding developing unit 9, in addition to the air discharging filter of a corresponding cyclone Cy. Hereinafter, the air-discharge filter portions PYf, PMf, PCf, and PKf are referred to as each air-discharge filter portion Pf. Each air-discharge filter portion Pf is a portion in which a filter made of nonwoven fabric or the like is attached to an opening (i.e., an air discharge hole or a through-hole) so as to cover the opening that is formed in the upper surface of a corresponding frame (i.e., the lid member) that forms a corresponding developing unit 9.

The toner T that has flowed into each developing unit 9 though a corresponding cyclone Cy is left in the developing unit 9, and at least one part of the air that has flowed into the developing unit 9 together with the toner T is discharged from the air-discharge filter portion Pf to the outside of the developing unit 9. In this configuration, since the increase of the internal pressure of the interior of each developing unit 9 is more reduced, the toner T and the air easily flows from a corresponding cartridge 430 to the developing unit 9 through a corresponding supply pipe 444. Since each air-discharge filter portion Pf is disposed in a corresponding developing unit 9, the toner T (and part of the air) easily flows into a corresponding developing unit 9 though a corresponding cyclone Cy.

In the present embodiment, each air-discharge filter portion Pf is disposed in a portion of the upper surface of a corresponding developing unit 9, formed downstream of a corresponding cyclone Cy in the direction in which the toner flows into the cyclone Cy. That is, the air-discharge filter portion PYf of the developing unit 9Y is disposed in a portion of the upper surface of the developing unit 9Y, formed on the RE side of the cyclone CyY in the Y direction; the air-discharge filter portion PMf of the developing unit 9M is disposed in a portion of the upper surface of the developing unit 9M, formed on the RE side of the cyclone CyM in the Y direction. The air-discharge filter portion PCf of the developing unit 9C is disposed in a portion of the upper surface of the developing unit 9C, formed on the LE side of the cyclone CyC in the Y direction; the air-discharge filter portion PKf of the developing unit 9K is disposed in a portion of the upper surface of the developing unit 9K, formed on the LE side of the cyclone CyK in the Y direction. In other words, the developer container 3 (i.e., a toner storage portion) of each developing unit 9 includes an opening and an air discharging filter that covers the opening, and the opening is disposed at a position separated more from the intake port (i.e., the inflow port) of the cyclone Cy than the air discharge port is in the rotation-axis direction of the developing roller 6. In this configuration, the discharging performance for the air can be increased by using the area in which each supply pipe 444 connected to a corresponding cyclone Cy is not disposed. Note that each air-discharge filter portion may be disposed not in the upper surface of a corresponding developing unit 9, but in a side surface of the developing unit 9.

Figure 13:
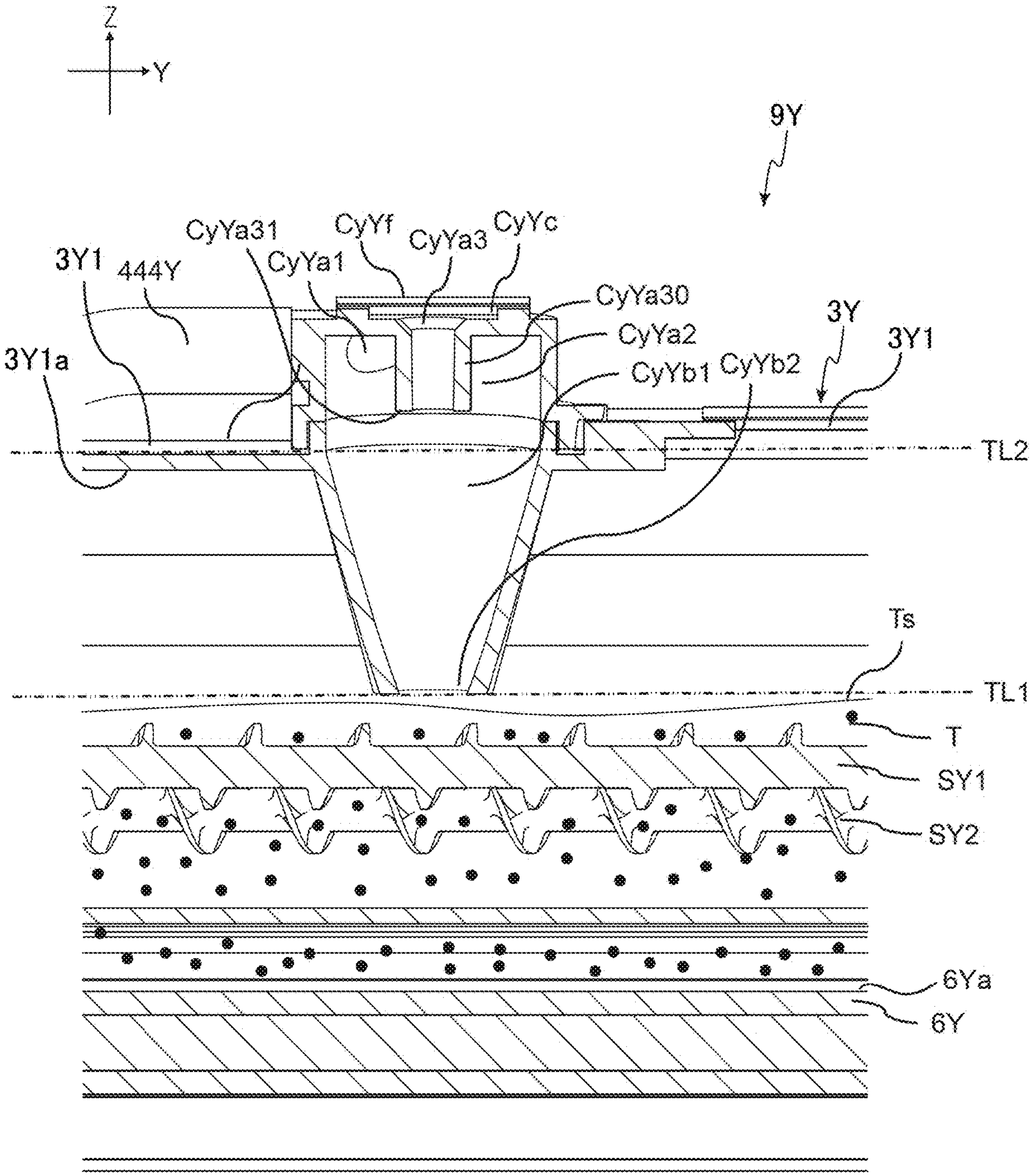
FIG. 13 is a cross-sectional view of a developing unit of the first embodiment.

The toner supplied from an end portion of the developing unit 9Y (i.e., the developer container 3Y) formed in the Y direction, into the developing unit 9Y is agitated and made uniform by agitating members SY1 and SY2 illustrated in FIGS. 5B and 13. Each of the agitating members SY1 and SY2 may be a screw that conveys the toner from an end portion of the developing unit 9Y on a side (i.e., the LE side) on which the downstream end portion 444Yd of the supply pipe 444Y is connected to the developing unit 9Y in the Y direction, to an end portion of the developing unit 9Y on the other side. Each of the agitating members SY1 and SY2 may not be a screw in which a helical blade is formed on a rotary shaft. For example, each of the agitating members SY1 and SY2 may be a paddle-like rotary member in which many short blades or projections are formed on a rotary shaft. In addition, the number of agitating members may be one, or three or more in accordance with the efficiency of agitation of the toner T, required in the developing unit 9Y.

In the present embodiment, the toner discharge port CyYb2 of the cyclone CyY is disposed in the upper surface of the developer container 3Y, and in the width area W6 of the developing roller 6Y in the Y direction (the width area W6 is an area in which the toner Tis used). Thus, the toner T supplied from the toner discharge port CyYb2 is allowed to easily reach the developing roller 6Y in the developer container 3Y. More specifically, the distance by which the toner T is conveyed in the Y direction for distributing the toner T over the width area W6 of the developing roller 6Y is shortened, compared with the distance, by which the toner Tis conveyed, in a configuration in which the toner discharge port CyYb2 is disposed outside the width area W6 of the developing roller 6Y in the Y direction. In addition, the toner can be efficiently conveyed from the cartridge 430Y to the developing roller 6Y.

Figure 12:
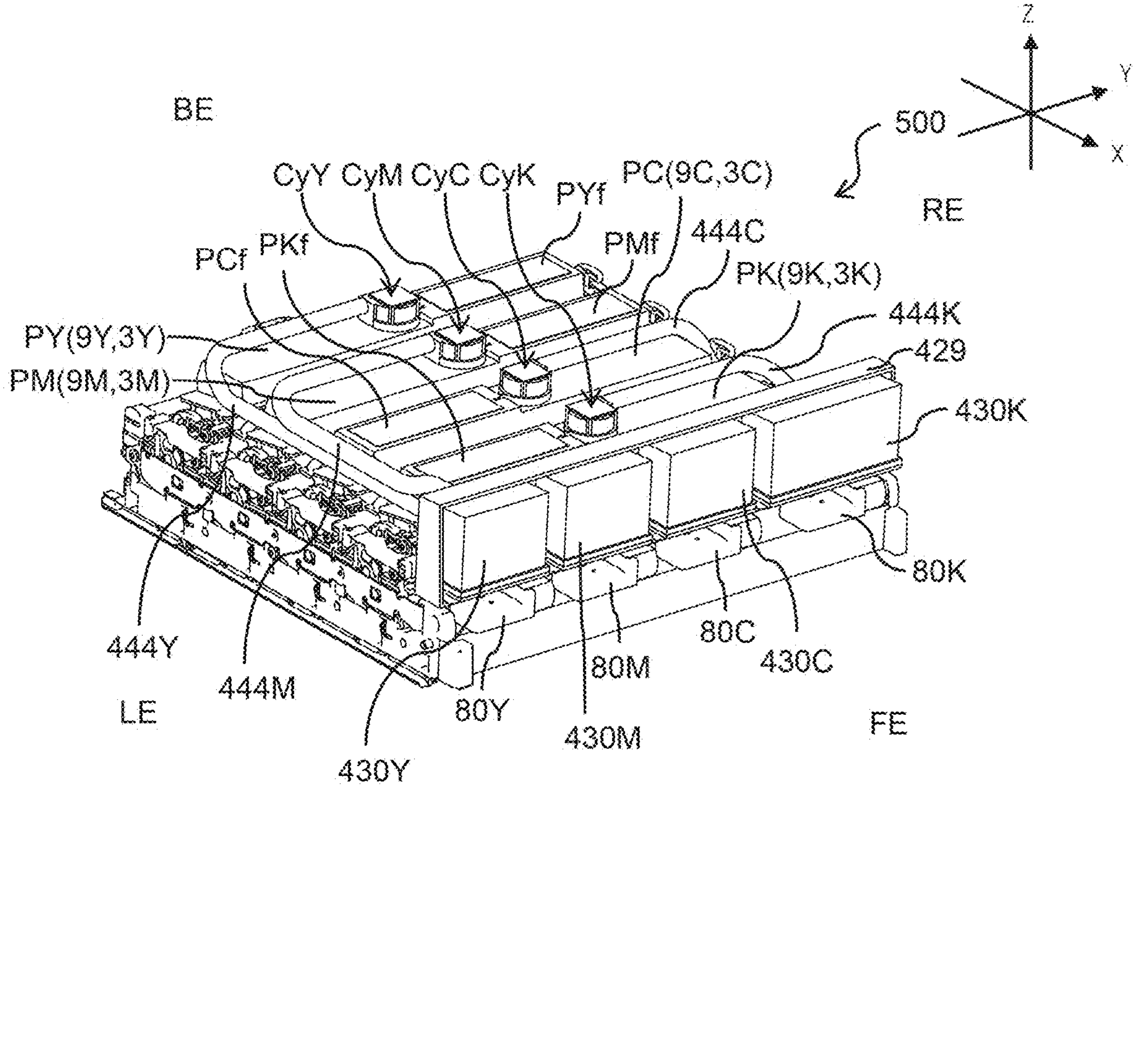
FIG. 12 is a perspective view of an image forming unit of a modification.

Note that in the present embodiment, as illustrated in FIG. 3A, the description is made for an example in which each cyclone Cy is disposed in an end portion of a corresponding developing unit 9 formed in the Y direction, in consideration of pressure loss. In a modification, however, each cyclone Cy may be disposed in a substantially central portion of a corresponding developing unit 9 in the Y direction, as illustrated in FIG. 12. The center of each developing unit 9 in the Y direction is an intermediate position between the position of one end portion of a corresponding developer container 3 and the position of the other end portion of the developer container 3 in the Y direction.

As illustrated in FIG. 11A, the toner T moves down, while whirling, in the cyclone CyY, and flows from the toner discharge port CyYb2 into the storage space formed in the developer container 3Y. The toner T discharged from the toner discharge port CyYb2 has the momentum in a direction along the inner wall of the conical portion CyYb1 (i.e., in the tangential direction of the circumference of the conical portion CyYb1). Thus, not all the toner T falls vertically in the Z direction from the toner discharge port CyYb2, and the other toner T disperses in the developing unit 9Y while moving in directions other than the Z direction. As a result, the efficiency of agitation performed in the developing unit 9Y can be increased. In addition, since the toner T is easily distributed over the width area W6 of the developing roller 6Y, the toner can be conveyed efficiently.

By the way, when the toner T is supplied into the developer container 3Y via the cyclone CyY, the toner T in the developer container 3Y may be whirled up and flow backward to the cyclone CyY. That is, the flow of the toner T discharged from the toner discharge port CyYb2 may blow against the toner T that has accumulated in the developer container 3Y, and part of the toner may be whirled up and flow from the toner discharge port CyYb2 into the cyclone CyY. In the following description, a preferable position of each portion of the cyclone CyY in the Z direction will be described with reference to FIG. 13. FIG. 13 is a cross-sectional view taken along a line C-C of FIG. 4B.

As illustrated in FIG. 13, if the surface (hereinafter referred to as a toner top surface Ts) of the toner T in the developer container 3Y has a higher position, the toner T may be whirled up and reach the cylindrical portion CyYa2 when toner is supplied. That is, the toner T in the developer container 3Y may flow backward to the cyclone CyY, and may be whirled up beyond a lower-end position TL2 of the cylindrical portion CyYa2. In this case, the toner T whirled up may flow into the air discharge port CyYa3, and cause the deterioration of the separation performance of the cyclone CyY. In addition, the toner T that flows into the air discharge port CyYa3 may cause the deterioration of the clogging prevention effect of the air discharge filter CyYf.

Thus, it is preferable that the lower-end position TL2 of the cylindrical portion CyYa2 in the Z direction (i.e., the gravity direction) be above the toner top surface Ts. Specifically, it is preferable that the lower-end position TL2 of the cylindrical portion CyYa2 be above the uppermost part of the outer circumferential surface 6Ya of the developing roller 6Y (i.e., the uppermost part of the toner bearing portion). It is preferable that the lower-end position TL2 of the cylindrical portion CyYa2 be above the agitating members SY1 and SY2 (that is, above the upper-edge position of the agitating members. If a plurality of agitating members is disposed, it is preferable that the lower-end position TL2 of the cylindrical portion CyYa2 be above an agitating member located higher than any other agitating members). With this arrangement, the possibility that the toner T whirled up when toner is supplied will flow into the air discharge port CyYa3 can be reduced.

Preferably, a position TL1 of the toner discharge port CyYb2 in the Z direction (i.e., the gravity direction) is positioned above the toner top surface Ts. Specifically, it is preferable that the position TL1 of the toner discharge port CyYb2 be positioned above the uppermost part of the outer circumferential surface 6Ya of the developing roller 6Y in the gravity direction. Preferably, the position TL1 of the toner discharge port CyYb2 is positioned above the agitating members SY1 and SY2. That is, it is preferable that the first discharge port be positioned above the uppermost part of the toner bearing portion of the developing roller. With this arrangement, the possibility that the toner T whirled up when toner is supplied will flow into the air discharge port CyYa3 can be reduced.

In addition, it is preferable that the position TL1 of the toner discharge port CyYb2 in the Z direction (i.e., the gravity direction) be above the rotation axis of each of the agitating members SY1 and SY2 (if a plurality of agitating members is disposed, it is preferable that the position TL1 of the toner discharge port CyYb2 in the Z direction be above the rotation axis of an agitating member located higher than any other agitating members). That is, in a case where the rotation axis of the developing roller 6Y is defined as a first rotation axis, the image forming apparatus further includes an agitating member that rotates on a second rotation axis for agitating toner stored in the toner storage portion. In this case, the first discharge port is positioned above the second rotation axis of the agitating member in the gravity direction. The second rotation axis of the present embodiment is the rotation axis of the agitating member SY1. With this arrangement, the possibility that the toner T whirled up when toner is supplied will flow into the air discharge port CyYa3 can be reduced.

In the present embodiment, the rotation axis (i.e., a second rotation axis) of the agitating member SY1 is positioned above the rotation axis (i.e., a first rotation axis) of the developing roller 6Y.

In a configuration in which the direction of a conveyance path changes on the way, like each supply pipe 444 of the present embodiment, or the toner conveyance path varies depending on the plurality of process units P or developing units 9, air is preferably used as a conveyance medium that conveys toner. In this configuration, the flexibility for designing the conveyance path can be made higher than that in a configuration in which a screw or the like is used as a conveyance portion, and the number of components can be reduced because the need for the conveyance member is eliminated.

Each supply pipe 444 is an example of a channel forming portion that is connected between the discharge port of a corresponding cartridge 430 (i.e., a toner container) and the inflow port of a corresponding cyclone Cy, and that forms a channel of the mixed air. Note that in the present embodiment, the whole of the channel extending from the discharge port of each cartridge 430 (i.e., a toner container) to the inflow port of a corresponding cyclone Cy is a corresponding supply pipe 444 formed as a cylinder-shape member. However, only a portion of the channel may be a supply pipe 444.

As illustrated in FIGS. 4B and 11A, in the present embodiment, it is preferable that the inflow port of each cyclone Cy face the rotation-axis direction (i.e., the Y direction) of the developing roller 6 of a corresponding developing unit 9. In the present embodiment, since the rotation-axis direction of each developing roller 6 is substantially equal to the Y direction, it is preferable that the inflow port of each cyclone Cy face the LE side or the RE side in the Y direction. That is, it is preferable that the intake port of each cyclonic separating portion be opened toward a direction from a center portion of a corresponding developing roller in the rotation-axis direction toward an end portion of the developing roller. For example, in this arrangement, the downstream end portion 444Yd of the supply pipe 444Y can be connected to the inflow port CyYa1, without having a shape in which the downstream end portion 444Yd is bent sharply.

Note that each supply pipe 444 has a shape in which the supply pipe 444 is bent such that the toner conveyance path extending from a corresponding cartridge 430 to a corresponding developing unit 9 does not block an optical path L extending from the laser scanner unit LB to a corresponding photosensitive drum 4. That is, each supply pipe 444 includes a corresponding one of intermediate portions (i.e., first portions) 444Yi, 444Mi, 444Ci, and 444Ki that passes through the outside of the optical path L and extends in a direction that intersects the rotation-axis direction (i.e., the Y direction) of the developing roller 6. In the present embodiment, the intermediate portions 444Yi, 444Mi, 444Ci, and 444Ki extend along the X direction. In addition, each supply pipe 444 includes a downstream end portion (i.e., a second portion) connected with the inflow port of a corresponding cyclone Cy and bent with respect to a corresponding one of the intermediate portions 444Yi, 444Mi, 444Ci, and 444Ki so as to extend in a direction along the rotation-axis direction (i.e., the Y direction) of the developing roller 6. The downstream end portion of each supply pipe 444 is a corresponding one of the above-described downstream end portions 444Yd, 444Md, 444Cd, and 444Kd. Thus, as described above, it is preferable that the inflow port of each cyclone Cy face the LE side or the RE side in the Y direction.

In addition, in the present embodiment, the inflow port of each cyclone Cy is disposed on a side separated more from a corresponding cartridge 430 in the X direction (in which each process unit P is arranged). For example, as illustrated in FIG. 11C, the inflow port CyYa1 of the cyclone CyY is disposed on the upper side in FIG. 11C (i.e., on the side separated more from the cartridge 430Y located on the lower side in FIG. 11C), with respect to the center axis Ax of the cyclone CyY in the X direction. With this configuration, the curvature radius of a bent portion of each supply pipe 444 (the bent portion is formed between the intermediate portion and the downstream end portion) can be increased without blocking the optical path L, so that the assembly work for each supply pipe 444 can be made easier. In addition, when toner is supplied, the toner receives centrifugal force in the bent portion between the intermediate portion and the downstream end portion, so that the toner deviates toward an outer side in the bent portion of each supply pipe 444. As illustrated in FIG. 11C, when viewed in the Z direction, an inner wall surface on an outer side at the bent portion of each supply pipe 444 is continuous with the inner surface of the cylindrical portion of a corresponding cyclone Cy. Thus, the mixed air is introduced into each cyclone Cy in a state where the toner deviates toward an inner surface side of the cylindrical portion, so that the separation efficiency can be further increased.

The above-described configuration of the cyclone CyY and the developing unit 9Y can also be applied to the other cyclones CyM, CyC, and CyK respectively disposed in the developing units 9M, 9C, and 9K.

Second Embodiment

In the above-described first embodiment, the description has been made, as an example, for the configuration in which the toner T is supplied from each supply pipe 444 to the storage space of a corresponding developer container 3 through a corresponding cyclone Cy. In the second embodiment, a channel for the mixed air may be disposed in each developer container 3, in addition to the storage space of the toner T. In the present embodiment, the mixed air that contains the toner T flows from each supply pipe 444 into the channel formed in a corresponding developer container 3, and the toner T is supplied from the channel to the storage space through the corresponding cyclone Cy. The present embodiment will be described with reference to FIGS. 14 to 16B. Hereinafter, a component given a reference symbol identical to a reference symbol of a component of the first embodiment has substantially the same structure and effects as those of the component described in the first embodiment, unless otherwise specified, and features different from those of the first embodiment will be mainly described.

Figure 14:
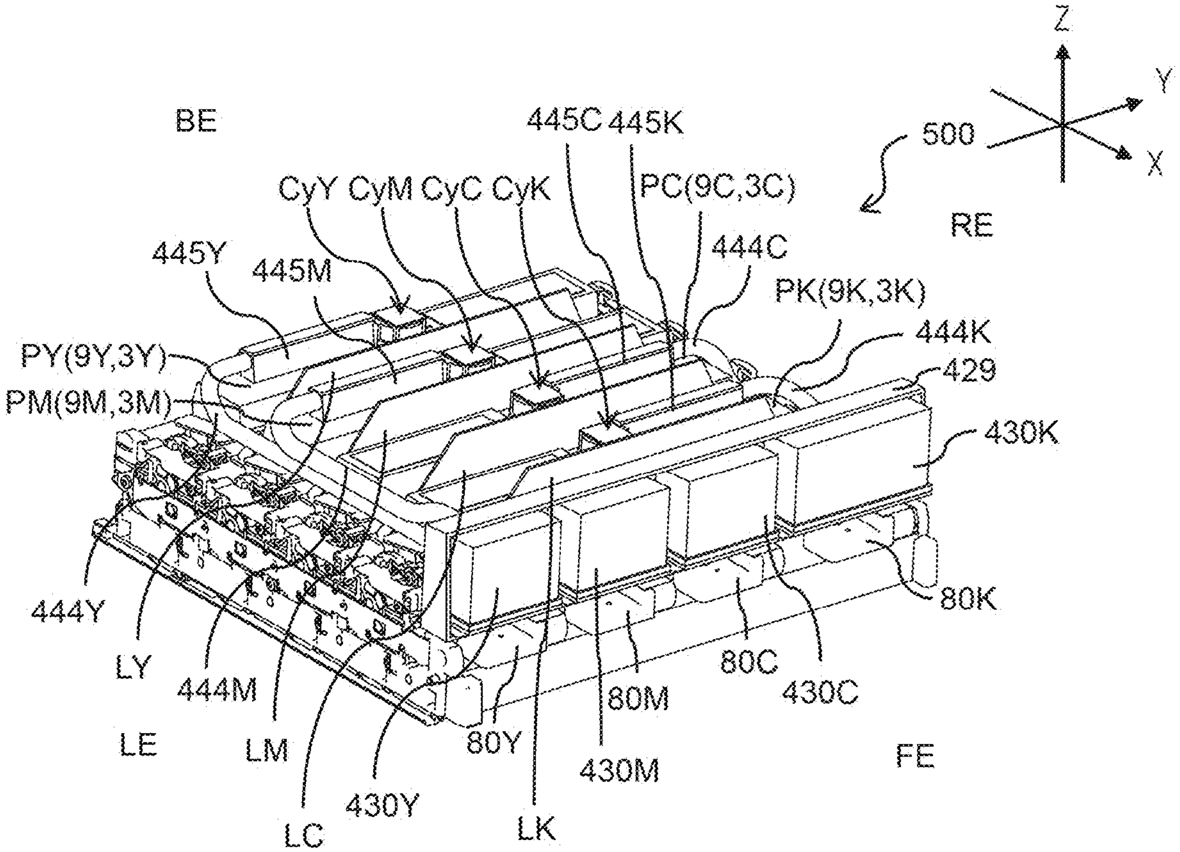
FIG. 14 is a perspective view of an image forming unit of a second embodiment.
Figure 15:
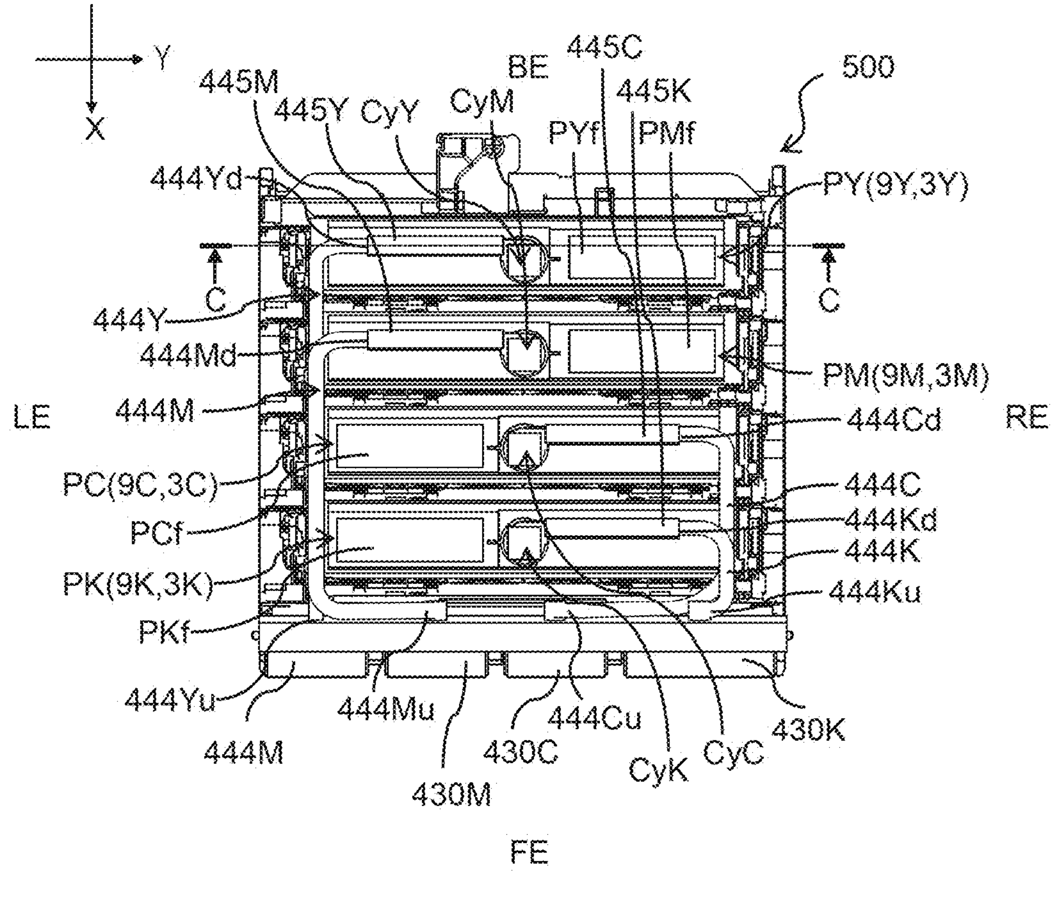
FIG. 15 is a top view of the image forming unit of the second embodiment.
Figure 16A:
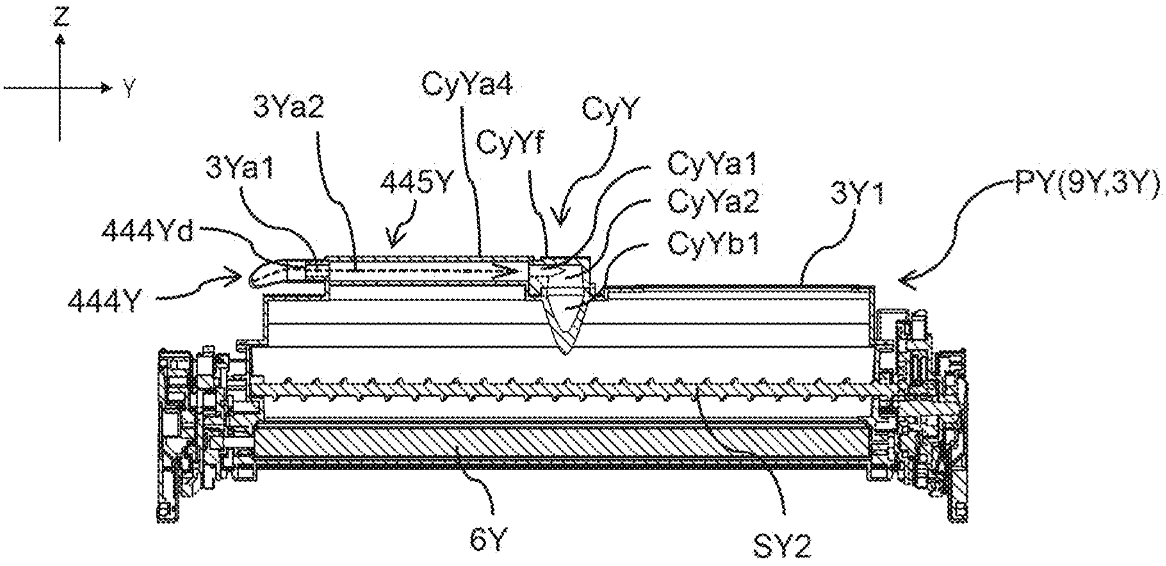
FIG. 16A is a cross-sectional view of the developing unit of the second embodiment.
Figure 16B:
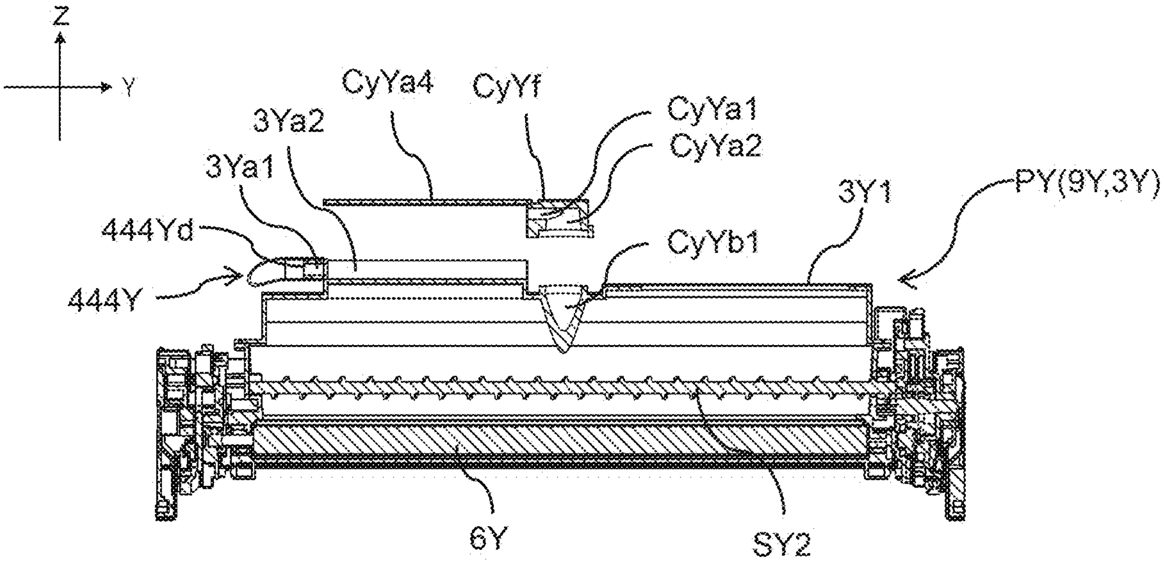
FIG. 16B is a cross-sectional view of the developing unit of the second embodiment.

FIG. 14 is a perspective view of an image forming unit 500 that is in a state where each cartridge 430 is attached to the image forming unit 500. FIG. 14 also illustrates each optical path L (LY, LM, LC, LK) of the laser beam that travels from the laser scanner unit LB toward a corresponding photosensitive drum 4. FIG. 15 is a top view of the image forming unit 500. FIG. 16A is a cross-sectional view taken along a line C-C of FIG. 15. FIG. 16B is a diagram illustrating a state where the cylindrical member CyYa of the cyclone CyY is removed, in FIG. 16A, from the conical frustum member CyYb and the lid member 3Y1 of the developer container 3.

As illustrated in FIG. 15, the downstream end portion 444Yd of the supply pipe 444Y is connected to a channel 445Y disposed in the developer container 3Y. As illustrated in FIGS. 16A and 16B, the channel 445Y is formed by a channel inflow port 3Ya1, a channel wall surface 3Ya2, and a channel top surface CyYa4. The channel inflow port 3Ya1 and the channel wall surface 3Ya2 are formed integrally with the lid member 3Y1 of the developer container 3Y, and the channel top surface CyYa4 is formed integrally with the cylindrical member CyYa of the cyclone CyY. The channel inflow port 3Ya1 is positioned at an end portion of the developer container 3Y (i.e., an end portion of the developing unit 9Y) in the Y direction. In addition, the cyclone CyY is positioned at a substantially central portion of the developer container 3Y (i.e., a substantially central portion of the developing unit 9Y) in the Y direction. The channel 445Y extends in the Y direction, from the channel inflow port 3Ya1 to the inflow port CyYa1 of the cyclone CyY through a conveyance space formed between the channel wall surface 3Ya2 and the channel top surface CyYa4. The conveyance space of the channel 445Y is formed on a top portion of the developer container 3Y; and is separated by the channel wall surface 3Ya2 and the cyclone CyY, from the storage space of the toner Y formed in the developer container 3Y.

The channel inflow port 3Ya1, the channel wall surface 3Ya2, and the channel top surface CyYa4 are an example of a channel forming portion that forms the channel 445Y, which is connected with the inflow port CyYa1 of the cyclone CyY. The channel is a channel through which the mixed air flows, and which is separated from the internal space of the developer container 3Y (i.e., a toner storage portion). The channel forming portion is fixed to the developer container 3Y (i.e., a toner storage portion). As in the present embodiment, it is preferable that at least a portion of the channel forming portion be formed integrally with the developer container 3Y (i.e., a toner storage portion).

The toner T having been conveyed to the downstream end portion 444Yd of the supply pipe 444Y flows into the channel 445Y from the channel inflow port 3Ya1 that is disposed at an end portion of the developer container 3Y in the Y direction, and passes through the channel 445Y and flows into the inflow port CyYa1 of the cyclone CyY. Thus, in the present embodiment, the conveyance path for the toner T that extends from an end portion of the developer container 3Y, formed in the Y direction, to the cyclone CyY disposed at a substantially central portion of the developer container 3Y is formed by the channel 445Y fixed to the top portion of the developer container 3Y.

Preferably, the position of the supply pipe 444Y in the X direction is restricted so that the supply pipe 444Y does not block the optical path LY. If a configuration in which the position of each supply pipe 444 is restricted in the X direction so as not to block a corresponding optical path L is added, the apparatus will become complicated and upsized. In the present embodiment, however, since the conveyance path for the toner T is formed by the channel 445Y fixed to the top portion of the developer container 3Y, each supply pipe 444 can be prevented from blocking a corresponding optical path L, without using any additional configuration.

Other Examples

In each of the above-described embodiments, the description has been made, as an example, for the configuration in which the air discharge filter CyYf is disposed on the air discharge port CyYa3 of the cyclone CyY. However, if the cyclone CyY has high separation performance, the air discharge filter CyYf may not be disposed.

In each of the above-described embodiments, the description has been made for the configuration in which each pump unit 80 disposed in the apparatus body 72 of the image forming apparatus 1 ejects air, so that the mixed air that contains the air from the pump unit 80 and the toner from a corresponding cartridge 430 is supplied to a corresponding cyclone Cy. However, the structure of each cyclone Cy described in each embodiment is applicable as long as the mixed air that contains the air and the toner to be supplied is supplied to the cyclone Cy.

For example, although each pump unit 80 and a corresponding cartridge 430 has a relationship of series (i.e., a relationship in which the air ejected from a pump unit 80 passes though the interior of a corresponding cartridge and the mixed air is discharged), each pump unit 80 and a corresponding cartridge 430 (i.e., a toner container) may have a relationship of parallel. That is, the channel of the air ejected from a pump unit 80 and the channel of the toner discharged from a corresponding cartridge 430 may join with each other, and the mixed air may flow from the joining portion to a corresponding cyclone Cy. In this case, for conveying the toner to the joining portion, a discharging unit (or a powder pump) that discharges the toner from the cartridge 430 (i.e., a toner container) may be disposed.

Each pump unit 80 is one example of an air supply portion that supplies air, used for supplying toner, to a corresponding developing unit. The air supply portion may not be a pump, but may be a fan.

In addition, the unit for generating the airflow for conveying the toner may be a portion of the toner container. For example, a positive-displacement pump formed like bellows may be disposed at an end portion of a cylindrical toner bottle. In this case, the positive-displacement pump may expand and contract in accordance with the rotation of the toner bottle, so that the mixed air that contains air and toner may be discharged from the toner bottle.

In another case, the image forming apparatus 1 may be configured so that the toner is supplied from the outside of the image forming apparatus 1 to each developer container 3 by using a toner container. For example, the toner container may be attached to an attachment portion disposed in the image forming apparatus 1, and the mixed air that contains air and toner may be discharged by a user operating the toner container. The toner container may be a container (i.e., a pouch container) which is formed like a bag and in which air and toner are enclosed, or may be a container which is formed like a cylinder and in which air and toner are enclosed.

In each of the above-described embodiments, each developing unit 9 may be a cartridge (i.e., a developing cartridge) that can be attached to and detached from the apparatus body 72. In addition, each process unit P that includes a corresponding developing unit 9 may be a cartridge (i.e., a process cartridge) that can be attached to and detached from the apparatus body 72.

The present disclosure can provide one new configuration for supplying toner by using air.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-135875, filed on Aug. 23, 2023, which is hereby incorporated by reference herein in its entirety.

What is claimed is:

1. An image forming apparatus comprising:
a photosensitive drum;
a developer container constituting a toner accommodating space for accommodating toner;
a developing roller configured to rotate about a rotation axis, the developing roller including a toner bearing portion configured to bear the toner accommodated in the developer container and supply the toner to the photosensitive drum; and
a cyclonic separating portion including an intake port, a first discharge port communicating with an interior of the developer container, and a second discharge port communicating with an outside of the developer container, the cyclonic separating portion being configured to take in air mixed with the toner through the intake port, separate the toner and the air from each other, discharge the toner separated from the air through the first discharge port, and discharge the air separated from the toner through the second discharge port,
wherein the cyclonic separating portion is provided on an upper surface portion of the developer container in a direction of gravity,
wherein the cyclonic separating portion includes a conical portion formed in a conical frustum shape whose radius decreases as the conical frustum shape extends downward in the direction of gravity,
wherein the first discharge port is disposed at a lower end portion of the conical portion,
wherein at least a portion of the conical portion projects downward, in the direction of gravity, with respect to an inner upper surface of the developer container constituting the toner accommodating space in the direction of gravity,
wherein the intake port of the cyclonic separating portion opens toward an end of the developing roller in a direction of the rotation axis, and
wherein when viewed in the direction of gravity, the first discharge port and the toner bearing portion of the developing roller overlap with each other.

2. The image forming apparatus according to claim 1,
wherein the first discharge port is disposed above an uppermost part of the toner bearing portion of the developing roller in the direction of gravity.

3. The image forming apparatus according to claim 1,
wherein the conical portion of the cyclonic separating portion is formed integrally with the upper surface portion of the developer container.

4. The image forming apparatus according to claim 1,
wherein the rotation axis is a first rotation axis,
wherein the image forming apparatus further comprises an agitating member configured to rotate about a second rotation axis for agitating toner accommodated in the developer container, and
wherein the first discharge port is disposed above the second rotation axis of the agitating member in the direction of gravity.

5. The image forming apparatus according to claim 1, wherein the cyclonic separating portion further includes a filter disposed so as to cover the second discharge port and configured to allow passage of air and prevent passage of toner.

6. The image forming apparatus according to claim 5, wherein the cyclonic separating portion further includes a tubular portion and a chamber portion, the tubular portion extending downward from the second discharge port along a direction of a center axis of the conical portion, with a lower end of the tubular portion open in an internal space of the cyclonic separating portion, the chamber portion being configured to form a space between the second discharge port and the filter, and wherein an area of a cross section of the space formed by the chamber portion at a plane perpendicular to the direction in which the tubular portion extends is larger than an area of a cross section of the tubular portion at a plane perpendicular to the direction in which the tubular portion extends.

7. The image forming apparatus according to claim 1, further comprising:

an air supply portion configured to supply air; and a toner container configured to store toner to be supplied to the developer container, the toner container including a taking-in port configured to take in air supplied from the air supply portion, and a discharge port configured to discharge the toner stored in the toner container together with the air supplied from the air supply portion.

8. The image forming apparatus according to claim 7, further comprising:

a pipe which communicates with the discharge port of the toner container, which is connected to the intake port of the cyclonic separating portion, and through which air mixed with toner passes, wherein the pipe is provided on a side of the end of the developing roller in the direction of the rotation axis of the developing roller.

9. The image forming apparatus according to claim 8, further comprising:

an exposure unit configured to expose the photosensitive drum for forming a latent image, wherein the pipe includes a first portion and a second portion, the first portion extending in a direction that intersects the rotation axis and disposed on an outside of an optical path from the exposure unit toward the photosensitive drum in the direction of the rotation axis, the second portion communicating with the first portion, extending along the direction of the rotation axis, and connected with the intake port.

10. The image forming apparatus according to claim 7, further comprising:

a pipe whose one end communicates with the discharge port of the toner container, and through which air mixed with toner passes; and a channel forming portion configured to form a channel which is connected to another end of the pipe and to the intake port of the cyclonic separating portion, through which the air mixed with the toner flows, and which is separated from an internal space of the developer container, wherein the channel forming portion is fixed to the developer container.

11. The image forming apparatus according to claim 1, wherein the developer container includes an opening and a filter that covers the opening, the opening being formed at a position separated more from the intake port than the second discharge port is in the direction of the rotation axis of the developing roller, the filter being configured to allow passage of air and prevent passage of toner.

12. An image forming apparatus comprising:

a photosensitive drum;

a developer container constituting a toner accommodating space for accommodating toner;

a developing roller configured to rotate about a rotation axis, the developing roller including a toner bearing portion configured to bear the toner accommodated in the developer container and supply the toner to the photosensitive drum; and a cyclonic separating portion including an intake port, a first discharge port communicating with an interior of the developer container, and a second discharge port communicating with an outside of the developer container, the cyclonic separating portion being configured to take in air mixed with the toner through the intake port, separate the toner and the air from each other, discharge the toner separated from the air through the first discharge port, and discharge the air separated from the toner through the second discharge port, wherein the cyclonic separating portion is provided on an upper surface portion of the developer container in a direction of gravity, wherein the cyclonic separating portion includes a conical portion formed in a conical frustum shape whose radius decreases as the conical frustum shape extends downward in the direction of gravity, wherein the first discharge port is disposed at a lower end portion of the conical portion, wherein at least a portion of the conical portion projects downward, in the direction of gravity, with respect to an inner upper surface of the developer container constituting the toner accommodating space in the direction of gravity, wherein the intake port of the cyclonic separating portion opens toward an end of the developing roller in a direction of the rotation axis, and wherein in the direction of the rotation axis, the first discharge port is disposed between positions of both ends of the toner bearing portion in the direction of the rotation axis.

13. An image forming apparatus comprising:

a photosensitive drum;

a developer container constituting a toner accommodating space for accommodating toner;

a developing roller configured to rotate about a rotation axis, the developing roller including a toner bearing portion configured to bear the toner accommodated in the developer container and supply the toner borne by the toner bearing portion to the photosensitive drum; and a cyclonic separating portion including an intake port, a first discharge port communicating with an interior of the developer container, and a second discharge port communicating with an outside of the developer container, the cyclonic separating portion being configured to take in air mixed with the toner through the intake port, separate the toner and the air from each other, discharge the toner separated from the air through the first discharge port, and discharge the air separated from the toner through the second discharge port, wherein in a direction of the rotation axis, the first discharge port is disposed between positions of both ends of the toner bearing portion in the direction of the rotation axis, and wherein the intake port of the cyclonic separating portion opens toward an end of the developing roller in the direction of the rotation axis.

14. The image forming apparatus according to claim 13, wherein the cyclonic separating portion is provided on an upper surface portion of the developer container in a direction of gravity, wherein the first discharge port is positioned below an inner upper surface of the developer container in the direction of gravity, and wherein the second discharge port is positioned above an upper surface of the developer container in the direction of gravity.

15. The image forming apparatus according to claim 13, further comprising:

an air supply portion configured to supply air; and a toner container configured to store toner to be supplied to the developer container, the toner container including a taking-in port configured to take in air supplied from the air supply portion, and a discharge port configured to discharge the toner stored in the toner container together with the air supplied from the air supply portion.

16. The image forming apparatus according to claim 15, further comprising:

a pipe which communicates with the discharge port of the toner container, which is connected to the intake port of the cyclonic separating portion, and through which air mixed with toner passes, wherein the pipe is provided on a side of the end of the developing roller in the direction of the rotation axis of the developing roller.

* * * * *